US012754988B2

(12) United States Patent
Steinbauer et al.

(10) Patent No.: US 12,754,988 B2
(45) Date of Patent: Oct. 6, 2026

(54) APPARATUS AND METHOD FOR BIOMETRIC ACCESS CONTROL

(71) Applicant: SkyX IP Holdings I LLC, New York, NY (US)

(72) Inventors: Martin Steinbauer, New York, NY (US); Jeffrey Chagnon, New York, NY (US)

(73) Assignee: SkyX IP Holdings I LLC, New York, NY (US)

( * ) Notice: Subject to any disclaimer, the term of this patent is extended or adjusted under 35 U.S.C. 154(b) by 0 days.

(21) Appl. No.: 19/232,972

(22) Filed: Jun. 10, 2025

(65) Prior Publication Data

US 2025/0363198 A1 Nov. 27, 2025

Related U.S. Application Data

(63) Continuation of application No. 18/918,246, filed on Oct. 17, 2024.

(60) Provisional application No. 63/644,063, filed on May 8, 2024.

(51) Int. Cl.
*G06F 21/32* (2013.01)

(52) U.S. Cl.
CPC .................................... *G06F 21/32* (2013.01)

(58) Field of Classification Search
CPC ..... G06F 21/32; G06F 3/041; G06K 9/00087; G06V 40/13; G06V 40/1335
See application file for complete search history.

(56) References Cited

U.S. PATENT DOCUMENTS

| | | | |
|---|---|---|---|
| 8,499,966 | B2 | 8/2013 | Palmer et al. |
| 8,567,639 | B2 | 10/2013 | Kim |
| 8,905,964 | B2 | 12/2014 | Poutiatine et al. |
| 8,907,794 | B2 | 12/2014 | Estevez et al. |
| 9,963,930 | B1 | 5/2018 | Reisender |
| 11,805,812 | B1 | 11/2023 | Nekos |
| 12,016,398 | B2 | 6/2024 | Daugherty et al. |
| 12,063,976 | B2 | 8/2024 | Naeckel et al. |
| 2002/0175238 | A1 | 11/2002 | Hatano et al. |
| 2004/0129587 | A1 | 7/2004 | Lax et al. |
| 2007/0168623 | A1 | 7/2007 | Amtmann |

(Continued)

OTHER PUBLICATIONS

International Search Report of PCT/US2025/028132 dated Jul. 21, 2025.

(Continued)

*Primary Examiner* — Vernal U Brown
(74) *Attorney, Agent, or Firm* — POLSINELLI PC

(57) ABSTRACT

An apparatus for biometric access control. The apparatus includes an outer body configured to house a plurality of internal components and a power source disposed within the outer body, wherein the power source is configured to provide power. Additionally, the apparatus includes a biometric sensor connected to the power source, wherein the biometric sensor is configured to receive biometric data associated with a user and a processing circuit communicatively connected to the biometric sensor. The processing circuit is configured to send identification data to an external device, receive an external response generated by the external device based on the identification data, and activate the biometric sensor based on the external response received from the external device.

19 Claims, 24 Drawing Sheets

(56) References Cited

U.S. PATENT DOCUMENTS

| | | | | |
|---|---|---|---|---|
| 2009/0071969 | A1 | 3/2009 | Lopez | |
| 2012/0238206 | A1 | 9/2012 | Singh et al. | |
| 2012/0322369 | A1 | 12/2012 | Khan | |
| 2013/0284192 | A1 | 10/2013 | Peleg et al. | |
| 2013/0327327 | A1 | 12/2013 | Edwards et al. | |
| 2014/0339249 | A1 | 11/2014 | Reddy et al. | |
| 2015/0013398 | A1 | 1/2015 | Taylor et al. | |
| 2015/0310186 | A1 | 10/2015 | Conley et al. | |
| 2016/0107820 | A1 | 4/2016 | MacVittie et al. | |
| 2016/0211693 | A1 | 7/2016 | Stevens et al. | |
| 2017/0076082 | A1 | 3/2017 | Arber | |
| 2017/0126267 | A1 | 5/2017 | Park et al. | |
| 2017/0193191 | A1 | 7/2017 | Blum et al. | |
| 2019/0021955 | A1 | 1/2019 | Omura | |
| 2019/0062038 | A1 | 2/2019 | Wilson et al. | |
| 2019/0158938 | A1 | 5/2019 | Bowen et al. | |
| 2019/0251329 | A1* | 8/2019 | Jiang | G06V 40/1365 |
| 2021/0011446 | A1 | 1/2021 | Anderson et al. | |
| 2021/0054653 | A1 | 2/2021 | Bloom et al. | |
| 2021/0100285 | A1 | 4/2021 | Spencer | |
| 2021/0319196 | A1* | 10/2021 | Rhee | G01L 1/16 |
| 2021/0350374 | A1 | 11/2021 | Keen | |
| 2022/0071299 | A1 | 3/2022 | Patel | |
| 2022/0138882 | A1 | 5/2022 | Yocam | |
| 2022/0358197 | A1* | 11/2022 | Wang | G06V 40/1318 |
| 2023/0080576 | A1 | 3/2023 | Businelle et al. | |
| 2023/0180826 | A1 | 6/2023 | Murison et al. | |
| 2024/0140685 | A1 | 5/2024 | Steinbauer et al. | |
| 2024/0398026 | A1 | 12/2024 | Stump et al. | |

OTHER PUBLICATIONS

International Search Report of PCT/US2025/028486 dated Jul. 25, 2025.

International Search Report of PCT/US25/34289 dated Aug. 5, 2025.

Non-Final Office Action for U.S. Appl. No. 19/206,297, issued Jul. 16, 2025 (10 pages).

Non-Final Office Action for U.S. Appl. No. 18/965,793, issued Mar. 14, 2025 (9 pages).

Non-Final Office Action for U.S. Appl. No. 18/965,564, issued Feb. 3, 2025 (8 pages).

Non-Final Office Action for U.S. Appl. No. 18/965,428, issued Mar. 28, 2025 (10 pages).

Final Office Action for U.S. Appl. No. 18/965,428, issued May 2, 2025 (10 pages).

Non-Final Office Action for U.S. Appl. No. 18/965,297, issued Feb. 13, 2025 (8 pages).

Final Office Action for U.S. Appl. No. 18/965,297, issued May 22, 2025 (22 pages).

Non-Final Office Action for U.S. Appl. No. 18/965, 146, issued Jul. 16, 2025 (16 pages).

Non-Final Office Action for U.S. Appl. No. 19/209,004, issued Aug. 14, 2025 (11 pages).

* cited by examiner

600

700

| MWK0864-1-V0.1 BOM 2024-4-2 | | | | | | | VER : A00 |
|---|---|---|---|---|---|---|---|
| NO | name of materia | Material specification | Package size | Component patch map number | quantity | Original accuracy | remark |
| 1 | MWK0864-1-V0.1 PCB | 16*12.5*1MM | | | 1 | | |
| 2 | cap0.1uF 0402 10V ±10% X5R | 0.1uF/10V/X5R | 0402C | C1, C5, C9 | 3 | | |
| 3 | cap 1uF 0402 10V ±10% X5R | 1uF/10V/X5R | 0402C | C3, C6, C8 | 3 | | |
| 4 | cap 1uF 0402 6.3V ±10% X5R | 2.2uF/6.3V/X5R | 0402C | C2, C4 | 2 | | |
| 5 | RES10R 0402 1/16W ±5% | 10R | 0402R | R3 | 1 | | |
| 6 | RES330R 0402 1/16W ±5% | 330R | 0402R | R4, R5, R6 | 3 | | |
| 7 | RES100K 0402 1/16W ±5% | 100K | 0402R | R7 | 1 | | |
| 8 | RES470K 0402 1/16W ±1% | 470K/1% | 0402R | R2 | 1 | | |
| 9 | RES47K 0402 1/16W ±5% | 47K | 0402R | R4-1 R2-1 | 2 | | |
| 10 | RES2 M 0402 1/16W ±1% | 2M/1% | 0402R | R1 | 1 | | |
| 11 | Schottky diode RB521S-30 SOD-523 | RB521S-30 | DIODE_0603(SOD-5 | D1 | 1 | | |
| 12 | LED DYF-1615RGB-N3N3S3YYD | DYF-1615RGB-N3N3S | LED0603 | D3 | 1 | | |
| 13 | P-MOS CJE3139K SOT523 | CJE3139K | SOT-523 | Q2 | 1 | | |
| 14 | FDN338P SOT523 | | SOT-523 | Q1 | 1 | | |
| 15 | FDN335N SOT523 | | SOT-523 | Q2-1 | 1 | | |
| 16 | tactile switch 5.2*5.2*2.5mm | SW-4P | SW_4P | SW1 | 1 | | |
| 17 | MFC_MJ08 QFN32 MCU | MFC_MJ08 | QFN32-4X4 | U1 | 1 | | |
| 18 | MCU E064N 12*8mm | E064N | E064N | U2 | 1 | | |
| 19 | LDO XC6206P332MR 3.3V SOT23-3 | XC6206P332MR | SOT23-3 | U3 | 1 | | |
| SUM | | | | | 26 | | |

FIG. 7

APPARATUS AND METHOD FOR BIOMETRIC ACCESS CONTROL

CROSS-REFERENCE TO RELATED APPLICATIONS

This application is a continuation of U.S. application Ser. No. 18/918,246 filed Oct. 17, 2024, and titled "APPARATUS AND METHOD FOR BIOMETRIC ACCESS CONTROL," which claims the benefit of U.S. Provisional Patent Application Ser. No. 63/044,063, filed on May 8, 2024, and titled "APPARATUS AND METHOD FOR BIOMETRIC ACCESS CONTROL," both of which is incorporated by reference herein in its entirety.

FIELD OF THE INVENTION

The present invention generally relates to the field of aerosol delivery devices. In particular, the present invention is directed to apparatuses and methods for biometric access control.

BACKGROUND

Aerosol delivery devices such as, without limitation, vaporizers, heat not burn devices, nebulizers, metered-dose inhalers, any other aerosol generation devices, and the like, have grown rapidly in the past few years. Oral nicotine products similarly have expanded in market share. Unlike oral nicotine products, however, aerosol delivery devices may be configured, customized, or otherwise controlled by a device user in a sophisticated manner; however, existing solutions may not provide any control to the manufacturers to prevent access and usage by unauthorized users.

SUMMARY OF THE DISCLOSURE

In an aspect, an apparatus for biometric access control includes an outer body configured to house a plurality of internal components and a power source disposed within the outer body, wherein the power source is configured to provide power. Additionally, the apparatus includes a biometric sensor connected to the power source, wherein the biometric sensor is configured to receive biometric data associated with a user and a processing circuit communicatively connected to the biometric sensor. The processing circuit is configured to send identification data to an external device, receive an external response generated by the external device based on the identification data, and activate the biometric sensor based on the external response received from the external device.

In another aspect, A method for biometric access control includes sending, by a processing circuit in an apparatus comprising an outer body, a power source disposed within the outer body, a biometric sensor connected to the power source, and the processing circuit communicatively connected to the biometric sensor, identification data to an external device. Further, the method includes receiving, by the processing circuit, an external response generated by the external device based on the identification data. Additionally, the method includes activating, by the processing circuit, the biometric sensor based on the external response received from the external device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is an exemplary bill of materials for an apparatus for biometric access control according to an embodiment of the invention;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Aspects of the present disclosure can be used to perform age restriction on the use of the apparatus. Aspects of the present disclosure can also be used to enforce age verification at retail locations. This is so, at least in part, because the apparatus may include an NFC chip in communication with an external device to lock and unlock the apparatus and/or biometric sensor.

Aspects of the present disclosure allow for monitoring a sales location and patterns of the apparatus. Exemplary embodiments illustrating aspects of the present disclosure are described below in the context of several specific examples.

Figure 1:
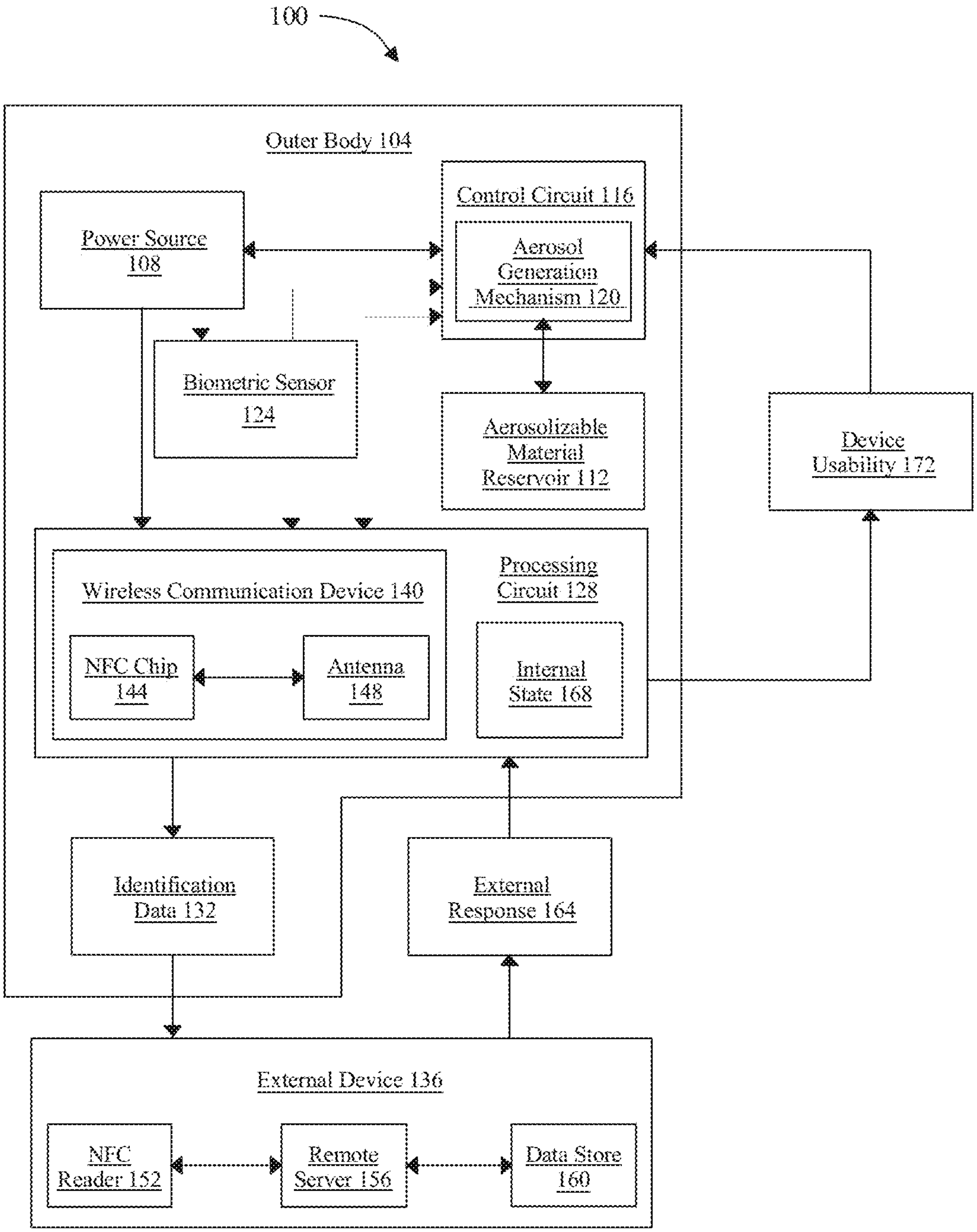
FIG. 1 is an exemplary embodiment of an apparatus for biometric access control.

Referring now to FIG. 1, an exemplary embodiment of an apparatus 100 for aerosol delivery is illustrated. For instance, apparatus 100 may include any apparatus as described in U.S. patent application Ser. No. 18/211,706, filed on Jun. 20, 2023, and entitled "APPARATUS AND METHOD FOR AEROSOL DELIVERY," U.S. patent application Ser. No. 18/410,193, filed on Jan. 11, 2024, and entitled "APPARATUS AND METHOD FOR PREVENTING YOUTH ACCESS AND COUNTERFEIT AEROSOL DELIVERY," and U.S. patent application Ser. No. 18/918,529, filed on Oct. 17, 2024, and entitled "APPARATUS AND METHOD FOR AN ORAL NICOTINE DISPENSING SYSTEM," which their entirety are incorporated herein by reference. Apparatus 100 includes an outer body 104. As used in this disclosure, an "outer body" is a container configured to encapsulate a plurality of internal elements of apparatus 100 such as, without limitation, any elements, components, and/or devices except for external device described below in this disclosure. Outer body 104 may be constructed of any suitable material or combination of materials. For instance, and without limitation, outer body 104 may be constructed at least in part of metal, such as without limitation aluminum, steel, or the like. Outer body 104 may be constructed at least in part of plastic, such as without limitation polyvinyl chloride (PVC), high-density polyethylene (HDPE), acrylonitrile butadiene styrene (ABS), or the like. Outer body 104 may be composed at least in part of ceramic. Outer body 104 may be composed at least in part of composite material; as a non-limiting example, outer body 104 may be composed at least in part of fiberglass or hemp fiber. Outer body 104 may be manufactured according to any suitable method or combination of methods, including without limitation casting, molding, subtractive processes such as machining, computer numerical control (CNC) machining, or the like, additive processes such as fused deposition printing, power-binder printing, selective laser sintering, stereolithography, or the like, lamination, coating, finishing, painting, polishing, engraving, anodization, assembly of parts through adhesion, engineering fits, fastening, fusing, or the like, or any combination thereof. Persons skilled in the art, upon reviewing the entirety of this disclosure, will be aware of various materials and/or material components usable to construct outer body 104 or other elements, components, and/or devices of apparatus 100, as well as suitable methods or combinations of methods for manufacturing outer body 104, components of outer body 104, and/or any other elements, components, and/or devices of apparatus 100 as consistent with the instant disclosure. Outer body 104 may be described in further detail below in reference to FIGS. 2A-2F.

With continued reference to FIG. 1, apparatus 100 includes a power source 108. As used in this disclosure, a "power source" is an element configured to provide electric power to a circuit or device. In some cases, power source 108 may be connected to a plurality of electronic device or components such as, without limitation, processing circuit, control circuit, and/or any computing device described below in this disclosure, and the like thereof. Power source 108 may include, without limitation, a battery containing one or more cell chemistries such as, without limitation, lithium cobalt oxide (LCO), lithium nickel cobalt aluminum oxide (NCA), lithium nickel manganese cobalt oxide (NMC), lithium iron phosphate (LFP), and the like; a power source may be rechargeable. In some embodiments, power source 108 may be further configured to transmit electric power to elements, components, and/or devices within apparatus 100 which requires electricity to operate, such as, without limitation, processing circuit, control circuit, and/or any computing device described in this disclosure, and the like thereof. In some cases, transmitting electric power may include using one or more continuous conductor. As used in this disclosure, a "continuous conductor" is an electrical conductor, without any interruption, made from electrically conducting material that is capable of carrying electrical current. Electrically conductive material may comprise copper for example. Electrically conductive material may include any material that is conductive to electrical current and may include, as a nonlimiting example, various metals such as copper, steel, or aluminum, carbon conducting materials, or any other suitable conductive material. In a non-limiting example, power source 108 may transmit electric power through a continuous conductive wire to control circuit and/or processing circuit. Additionally, or alternatively, power source 108 may be integrated and/or embedded within control circuit and/or processing circuit. In a non-limiting example, control circuit and/or processing circuit may be supplied by separate power sources. In other embodiments, control circuit and/or processing circuit may share a common power source 108. In a non-limiting example, a power source 108 may be remote to control circuit and/or processing circuit and transmit electric power through one or more continuous conductor to control circuit and/or processing circuit over a distance within apparatus 100.

With continued reference to FIG. 1, apparatus 100 may include an aerosolizable material reservoir 112. In an embodiment, aerosolizable material reservoir 112 may be insertable as a cartridge (e.g., "a cartridge system") to be fastened to outer body 104. Additionally, or alternatively, aerosolizable material reservoir 112 may be integrated into apparatus 100 and/or outer body 104 (e.g., "a single-use/disposable system"). As used in this disclosure, an "aerosolizable material reservoir" is a component of apparatus 100 configured to hold an aerosolizable material. "Aerosolizable material," for the purpose of this disclosure, is a material that is capable for aerosolization, wherein the aerosolization is a process of intentionally oxidatively converting and suspending particles or a composition in a moving stream of air. Aerosolizable material may include one or more active ingredients and/or chemicals, including without limitation pharmaceutical chemicals, recreational chemicals, flavor-bearing chemicals, and the like. Chemicals may be extracted, without limitation, from plant material, and/or a botanical, such as tobacco or other herbs or blends.

Chemicals may be in pure form and/or in combination or mixture with humectants that may or may not be mixed with plant material. In a non-limiting example, aerosolizable material may include E-cigarette liquid, wherein the E-cigarette liquid is a liquid solution or mixture used in aerosol delivery device such as, without limitation, an e-cigarette. In some cases, aerosolizable material may include a humectant, wherein the "humectant" may generally refer to as a substance that is used to keep things moist. Humectant may attract and retain moisture in the air by absorption, allowing the water to be used by other substances. Humectants are also commonly used in many tobaccos or botanicals and electronic vaporization products to keep products moist and as vapor-forming medium. Examples may include, without limitation, propylene glycol, sugar polyols such as glycerol, glycerin, honey and the like thereof. Continuing the non-limiting example, E-cigarette liquid may comprise of a combination of propylene glycol and glycerin (95%), and flavorings, nicotine, and other additives (5%). In some embodiments, aerosolizable material held by aerosolizable material reservoir 112 may be replaceable. In a non-limiting example, aerosolizable material reservoir may include a secondary container such as a liquid chamber, wherein the liquid chamber may contain a single type of aerosolizable material. Liquid chamber may be inserted into aerosolizable material reservoir; in other words, aerosolizable material may not be in direct contact with aerosolizable material reservoir. User of apparatus 100 may switch from a first aerosolizable material to a second aerosolizable material by ejecting a first liquid chamber storing the first aerosolizable material from aerosolizable material reservoir 112 and inserting a second liquid chamber storing the second aerosolizable material into aerosolizable material reservoir 112.

With continued reference to FIG. 1, apparatus 100 may include a control circuit 116. As used in this disclosure, a "control circuit" is a circuit configured to detect or otherwise control a status of one or more elements, components, and/or devices within apparatus 100. Control circuit may be implemented, without limitation, as an application-specific integrated circuit (ASIC), a reconfigurable hardware circuit such as a field-programmable gate array (FPGA), as a microprocessor, microcontroller, an analog circuit such as without limitation an operational amplifier circuit, or as any other circuit capable of generating signals as described in further detail below. In some embodiments, without limitation, control circuit 108 may be further configured to control other elements, components, and/or devices within apparatus 100. Control circuit 116 of apparatus 100 includes an aerosol generation mechanism 120. For instance, and without limitation, control circuit 116 may be configured to direct, control, or otherwise regulate the output of electric power from power source 108 through continuous conductor to other components of apparatus 100 that require electric power input such as, without limitation, aerosol generation mechanism 120.

With continued reference to FIG. 1, as used in this disclosure, an "aerosol generation mechanism" is a component of apparatus 100 configured to generate aerosol using an aerosolizable material. In an embodiment, aerosol generation mechanism may be configured to convert any aerosolizable material into a vapor or mist. "Vapor," for the purpose of this disclosure, refers to a substance that is in a gas phase at a temperature lower than its critical point. The vapor may be condensed to a liquid or to a solid by increasing its pressure without reducing the temperature. Vapor may include an aerosol, where "aerosol" may generally refer to a colloid of fine solid particles or liquid droplets in air or another gas. Examples of aerosols may include clouds, haze, and smoke, including the smoke from tobacco or botanical products, or mist from nebulizers, soft mist inhalers, etc. The liquid or solid particles in an aerosol may have varying diameters of average mass that may range from monodisperse aerosols, producible in the laboratory, and containing particles of uniform size; to polydisperse colloidal systems, exhibiting a range of particle sizes. As the sizes of these particles become larger, they have a greater settling speed which causes them to settle out of the aerosol faster, making the appearance of the aerosol less dense and to shorten the time in which the aerosol will linger in air. Interestingly, an aerosol with smaller particles will appear thicker or denser because it has more particles. Particle number has a much bigger impact on light scattering than particle size (at least for the considered ranges of particle size), thus allowing for a vapor cloud with more smaller particles to appear denser than a cloud having fewer, but larger particle sizes.

With continued reference to FIG. 1, in some embodiments aerosol generation mechanism 120 may include various internal elements, including without limitation, a heating element, which may include a resistive heater configured to thermally contact the aerosolizable material from aerosolizable material reservoir 112. Power source 108 controlled by control circuit 116, as described above, may provide electricity to heating element. In a non-limiting example, using heating element of aerosol generation mechanism 120 for vaporization of aerosolizable material may be used as an alternative to burning (smoking) which may avoid inhalation of many irritating and/or toxic carcinogenic by-products which may result from pyrolytic processes of burning material such as, without limitation, tobacco or botanical products above 300 degrees C. Heating element may operate at a temperature at/or below 300 degrees C., configured by aerosol generation mechanism 120, controlled by control circuit 116.

In a non-limiting example, and still referring to FIG. 1, aerosol generation mechanism 120 may include an atomizer and/or cartomizer configured to heat aerosolizable material. As used in this disclosure, an "atomizer" is a device for emitting liquid, such as aerosolizable material, as a fine spray such as, without limitation, a vapor. Aerosolizable material may include any aerosolizable material described above in this disclosure; for instance, and without limitation, aerosolizable material may comprise glycerin and/or propylene glycol. The aerosolizable material may be heated, by heating element described above, to a sufficient temperature such that it may vaporize. Atomizer may be a device or system configured to generate an aerosol. An atomizer may include, without limitation, a small heating element that heats and/or vaporizes at least a portion of aerosolizable material and a wicking material that may draw a liquid aerosolizable material in to the atomizer; a wicking material may comprise silica fibers, cotton, ceramic, hemp, stainless steel mesh, and/or rope cables. A wicking material may be designed and/or configured to draw liquid aerosolizable material into atomizer without a pump or other mechanical moving part. A resistance wire may be wrapped around a wicking material and then connected to a positive and negative pole of a current source such as a power source as noted above; a resistance wire may include, without limitation, a coil, and when activated may have a temperature increase as a result of the current flowing through the resistive wire to generate heat. Heat may be transferred from heating element to aerosolizable material through conductive, convective, and/or radiative heat transfer such that aerosolizable material vaporizes.

In another non-limiting example, and further referring to FIG. 1, as an alternative or additional element to the atomizer, aerosol generation mechanism 120 may include a "cartomizer" to generate aerosol from the aerosolizable material for inhalation by the user of apparatus 100. As used in this disclosure, a "cartomizer" is a combination of a cartridge and atomizer as described above, wherein the cartridge is a component that holds aerosolizable material. As a non-limiting example, cartridge may include aerosolizable material reservoir 112. A cartomizer may include a heating element surrounded by a liquid-soaked poly-foam that acts as holder for aerosolizable material, which may include without limitation a liquid. In some embodiments, aerosol generation mechanism 120 may not have an atomizer or cartomizer, but may include an oven instead, which may be at least partially closed. An "oven," for the purpose of this disclosure, is a component configured to heat confined substances, such as, without limitation, aerosolizable material. Oven may have a closable opening. Oven may be wrapped with heating element or may be in thermal communication with a heating element by means of another mechanism. Aerosolizable material may be placed directly in an oven or in a liquid chamber fitted in the oven. A heating element in thermal communication with the oven may heat aerosolizable material mass in order to create a gas phase vapor, including without limitation through conductive, convective, and/or radiative heat transfer. Vapor may be released to a vaporization chamber where gas phase vapor may condense, forming an aerosol cloud having typical liquid vapor particles with particles having a diameter of average mass of approximately 1 micron or greater. In some cases, the diameter of average mass may be approximately 0.1-1 micron.

With continued reference to FIG. 1, air may be drawn into aerosol generation mechanism 120 to carry the vaporized aerosol away from heating element, where it then cools and condenses to form liquid particles suspended in air, which may then be drawn out of a mouthpiece by the user. Mouthpiece may be described in further detail below with reference to FIG. 4. In a non-limiting example, apparatus may include an air hole, wherein the air hole is a hole or passage that allows air to pass through apparatus 100. In an embodiments, fresh air may be allowed to enter apparatus 100 when the heating element is on. Vaporization of aerosolizable material may occur at lower temperatures in aerosol generation mechanism 120 compared to temperatures required to generate an inhalable vapor in an actual cigarette. Actual cigarette may be a device in which a smokable material is burned to generate an inhalable vapor. The lower temperature of aerosol generation mechanism 120 may result in less decomposition and/or reaction of aerosolizable material, and therefore produce an aerosol with many fewer chemical components compared to actual cigarette. In some cases, aerosol generation mechanism 120 may generate aerosol with fewer chemical components that may be harmful to human health compared to actual cigarette.

With continued reference to FIG. 1, additionally, or alternatively, apparatus 100 includes a biometric sensor 124. As used in this disclosure, a "biometric sensor" is a device that captures and measures specific physiological or behavioral characteristics of the user for biometric identification or authentication. In an embodiment, biometrics may include unique and measurable traits of the user which may be used to verify user's identity and grant access to apparatus 100. In a non-limiting example, biometric sensor 124 may include any device that integrates fingerprint scanner, facial recognition solution, voice recognition, iris scans, palm prints, hand geometry, and/or the like to limit only authorized users from using apparatus 100 for the delivery of aerosolizable material delivery and/or aerosol generation. In some cases, apparatus 100 described herein may be activated at the point of sale, after verifying user ID, a limited time window to fingerprint user on apparatus 100 may be given to the authorized purchaser (in most cases, authorized purchaser will be the user); apparatus 100 may need to be reactivated at a point of sale to limit aftermarket sale if the limited time window elapses. However, user within a specific amount of time uses a finger, for example, and without limitation, a thumb on their hand of use, biometric sensor such as a finger printer scanner may be allowed to take shots from a plurality of angles and shots may be stored as reference biometric data. In a non-limiting example, fingerprint scanner may be first activated (e.g., turned on), prior to the activation of the device through a wireless communication device, upon receiving an activation datum from an external device in communication with the wireless communication device as described in further detail herein. Such fingerprint scan may then be used to reactivate apparatus 100 (either per inhalation, or for a specific amount of time) for the authorized user later. Biometrics data may be encrypted according to methods described in a later section. Biometrics user data for the purpose of youth access prevention is also subject to biometric data regulation, such as for example 740 ILCS 14/Biometric Information Privacy Act (BIPA). These regulations typically require private entities in possession of biometric identifiers or biometric information to develop a written policy establishing a retention schedule and guidelines for permanently destroying biometric identifiers and biometric information when the initial purpose for collecting. Importantly, biometric information may not be uploaded into the cloud but remain locally on the device and initiate a data wipe at a pre-specified time such as 6 months or a year, thereby making the device and biometric pairing BIPA-compliant.

With continued reference to FIG. 1, apparatus 100 includes a processing circuit 128. As used in this disclosure, a "processing circuit" is a circuit configured to perform processing and/or memory functions. In a non-limiting example, processing circuit 128 may be configured to process any processing steps described in this disclosure. Processing circuit 128 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processing circuit 128 may include a single computing device operating independently, or may include two or more computing device operating in concert, in parallel, sequentially or the like; two or more computing devices may be included together in a single computing device or in two or more computing devices. Processing circuit 128 may interface or communicate with one or more additional devices as described below in further detail via a network interface device. Network interface device may be utilized for connecting processing circuit 128 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processing circuit 128 may include but is not limited to, for example, a computing device or cluster of computing devices in a first location and a second computing device or cluster of computing devices in a second location. Processing circuit 128 may include one or more computing devices dedicated to data storage, security, distribution of traffic for load balancing, and the like. Processing circuit 128 may distribute one or more computing tasks as described below across a plurality of computing devices of computing device, which may operate in parallel, in series, redundantly, or in any other manner used for distribution of tasks or memory between computing devices. Processing circuit 128 may be implemented using a "shared nothing" architecture in which data is cached at the worker, in an embodiment, this may enable scalability of apparatus 100 and/or computing device.

With continued reference to FIG. 1, processing circuit 128 may be designed and/or configured to perform any method, method step, or sequence of method steps in any embodiment described in this disclosure, in any order and with any degree of repetition. For instance, processing circuit 128 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processing circuit 128 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, in an embodiment, apparatus 100 and methods described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some embodiments, apparatus 100 and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

With continued reference to FIG. 1, embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and continuing to refer to FIG. 1, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Further referring to FIG. 1, zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, in some embodiments, processing circuit 128 is configured to send identification data 132 associated with apparatus 100 to an external device 136. As used in this disclosure, "identification data" is data that uniquely identifies apparatus 100 and/or a user of apparatus 100. In a non-limiting example, a first aerosol delivery device may include first identification data associated therewith and a second aerosol delivery device may include second identification data associated therewith, wherein at least a portion of first identification data may be different than at least a portion of second identification data, although both the first aerosol delivery device and the second aerosol delivery device may be manufactured by a same manufacturer. In some embodiments, identification data 132 may include, without limitation, production timestamp, production line serial number, device serial number, device ID, batch number, and the like thereof. In other embodiments, identification data 132 may include user metadata. As used in this disclosure, "user metadata" is data that provides information about user of apparatus 100. In some cases, user may include a buyer of apparatus 100 who purchase apparatus 100 from a retailer. In other cases, user may include retailer who stocks apparatus 100 from a supplier (such as a vendor). In some embodiments, user metadata may be received, collected, or otherwise gathered, by processing circuit 128, from the user at the time of purchasing. User metadata may include, without limitation, purchase timestamp, name, address, email address, date of birth, user identification, and the like thereof. In a non-limiting example, user metadata within identification data associated with apparatus 100 may be generated, by processing circuit 128, as a function of the transaction; for instance, and without limitation, user metadata may be collected from payment and/or ID verification during the transaction. Additionally, or alternatively, identification data may be encrypted, by processing circuit 128, in one or more ways described above in reference to the cryptographic system. In a non-limiting example, processing circuit 128 may encrypt identification data 132 into one or more hashes through hash functions as described above.

With continued reference to FIG. 1, additionally, or alternatively, processing circuit 128 may be configured to send usage data associated with apparatus 100 to external device 136. As used in this disclosure, "usage data" refers to information related to how apparatus 100 is used by the user. In an embodiment, usage data may be used to provide insights into user realior. In a non-limiting example, usage data may include a puff count, wherein the puff count may indicate number of times the user takes a puff (i.e., user inhalation) from apparatus 100. In some cases, puff count may be used to estimate how much aerosolizable material (i.e., e-liquid) is consumed by the user and to track usage of apparatus 100 over time. In a non-limiting example, puff count may be used to determine a quantity of active ingredient inhaled by the user. In another non-limiting example, usage data may include a battery usage, wherein the battery usage may indicate how much battery (i.e., power source) power is consumed by apparatus 100. In a further non-limiting example, a use duration may also be recorded by apparatus 100, wherein the use duration may indicate the length of time that the user spends using apparatus 100. Usage data may be collected by processing circuit; for instance, and without limitation, processing circuit 128 may be programed to count how long and at what interval or time the battery is activated via an automated tracker, instead of user self-reporting usage or camera filming the user. Automated tracker (e.g., puff counter, battery monitor, temperature sensor, motion sensor, and/or the like) may be integrated on a printed circuit board assembly (PCBA) as described below in further detail. As such, duration of each inhalation session, and also the total duration may be calculated and/or recorded (e.g., usage 1, 3 seconds, usage 2, 3.5 seconds, . . . , usage N, 3 seconds) by processing circuit 128. In some cases, total duration may be calculated without a timestamp; for instance, and without limitation, processing circuit 128 may record at $T_0$, wherein $T_0$ may be a first inhalation session, upon unlock apparatus 100 through external device as described below, or at a preprogrammed time running on UTC.

With continued reference to FIG. 1, in some embodiments, processing circuit 128 may include a wireless communication device 140 configured to communicate with external device 136. As used in this disclosure, a "wireless communication device" is a device that is capable of communicating with other devices without a physical and electrical connection. Communication may include, without limitation, data transfer, signal transmission, and the like thereof. In some embodiments, wireless communication device 140 may be configured to communicate with external device 136 within a communication network. Communication network may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wireless mode of communication. Additionally, or alternatively, wireless communication device 140 may use radio frequency identification (RFID) to communicate with external device 136, wherein the RFID is a form of wireless communication that incorporates the use of electromagnetic or electrostatic coupling in the radio frequency portion of the electromagnetic spectrum to uniquely identify an object such as, without limitation, apparatus 100. In some embodiments, wireless communication device 140 using RFID may include a transponder, wherein the transponder is a component that is configured to respond to different incoming signals. Further wireless communication device using RFID may be operate under different frequency; for instance, wireless communication device may operate at various frequency including, without limitation, low frequency (30 KHz to 500 KHz), high frequency (3 MHz to 30 MHz), Ultra high frequency (300 MHz to 960 MHz), and the like thereof.

With continued reference to FIG. 1, in other embodiments, wireless communication device 140 may include a near field communication (NFC) chip 144. As used in this disclosure, a "near field communication chip" is a component that enables processing circuit 128 to communicate with other devices such as external device 136 wirelessly, within a short range using near-field communication technology, wherein the near-field communication technology may enable NFC chip to execute a plurality of communication protocols that enables communication between two devices, such as, without limitation, wireless communication device 140 to external device 136, over a distance of 4 cm (1.5 inches) or less. NFC chip 144 may offer a low-speed connection used to bootstrap one or more wireless connection similar to proximity card technology; for instance, and without limitation, NFC chip 144 may function as a smart card. Additionally, or alternatively, NFC chip 144 may further include an antenna 148 communicatively connects to it. As used in this disclosure, an "antenna" is a device configured to convert voltage from a transmitter into a radio signal. Antenna 148 may pick radio signals out of the air and convert them into voltage for recovery in a receiver. In an embodiment, antenna may include a transducer. In some cases, a plurality of antennas may be connected to NFC chip 144. In a non-limiting example, wireless communication device 140 with NFC chip 144 connecting to two antennas may communicate with external device 136 in both directions using a frequency of 13.56 MHz in globally available unlicensed radio frequency ISM band using ISO/IEC 18000-3 air interface standard at data rates ranging from 106 to 424 kbit/s. Further, NFC chip 144 may be disposed within outer body 104; for instance, and without limitation, on the cartridge as described in further detail below in reference to FIG. 4. In other cases, NFC chip 144 may be disposed externally to outer body 104. In such embodiment, NFC chip 144 may include an NFC sticker that adheres to the exterior of outer body 104.

Still referring to FIG. 1, as used in this disclosure, a "signal" is any intelligible representation of data, for example from one device to another. A signal may include an optical signal, a hydraulic signal, a pneumatic signal, a mechanical signal, an electric signal, a digital signal, an analog signal and the like. In some cases, a signal may be used to communicate with a computing device, for example by way of one or more ports. In some cases, a signal may be transmitted and/or received by a computing device, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Further referring to FIG. 1, in some cases, processing circuit 128 may perform one or more signal processing steps on a signal. For instance, processing circuit 128 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, in some embodiments, identification data 132 may include a unique identifier (ID) associated with NFC chip 144. As used in this disclosure, a "unique identifier" is an element of data that uniquely identifies wireless communication device 140 and/or NFC chip 144. In an embodiment, unique identifier may include a sequence of numbers. In another embodiments, unique identifier may include a combination of numbers, letters, and/or characters. In some embodiments, unique identifier may be generated, by processing circuit 128, external device 136, and/or any other computing device, during production. In a non-limiting example, after quality control and puff sensor machine testing during production, external device 136 may generate and/or assign a unique ID to apparatus 100 through NFC chip 144 that in communication with external device 136. Unique ID may be encoded on the NFC chip and/or stored in external device 136 as described in further detail below. In some embodiments, communication between wireless communication device 140 and external device 136 may be in real-time as communicated through communication network described above. In a non-limiting example, processing circuit 128 may be configured to send identification data, such as, without limitation, unique ID, user metadata, and the like to external device 136 through wireless communicating device 140 using NFC chip 144 to external device 136. Such communication may be triggered when NFC chip 144 is detected within the specified range by external device 136 as described in further detail below. Additionally, or alternatively, transmitting unique ID associated with NFC chip 144 may provide manufacturing businesses quality control, especially in complex electric, mechanical, and chemical systems such as vaporizers or other aerosol generating devices for quality assurance during manufacturing and/or selling products. Aerosol delivery device with NFC enabled, such as, without limitation, apparatus 100 with unique ID may allow the manufacturer to identify and isolate any affected batches during and/or after manufacturing. This could assist in recalls or in alerts to retailers not to sell products within affected batches. Further, by transmitting unique ID associated with NFC chip 144 for each device purchased, retailers and the brand may track inventory and rate of sales to ensure stocking issues are avoided. Additionally, or alternatively, unique identifier may include any unique identifiers as described in U.S. patent application Ser. No. 18/211,726, filed on Jun. 20, 2023, and entitled "APPARATUS AND METHOD FOR UNIQUE IDENTIFICATION OF AN OBJECT USING NEAR-FIELD COMMUNICATION (NFC)," which its entirety is incorporated herein by reference.

With continued reference to FIG. 1, as used in this disclosure, an "external device" is any device exterior to apparatus 100 that communicates with elements within apparatus 100. In some embodiments, external device 136 may include a user device. A "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100, any computing device, and/or decentralized platform 108. In a non-limiting example, external device may include a transceiver, wherein the transceiver is a component (a combination of transmitter and/or receiver in a single package) configured to transmit, as well as receive, different signals as described above. In a non-limiting example, communication between wireless communication device 140 and external device 136 may include the use of Bluetooth Low Energy (Bluetooth LE, colloquially BLE) as a wireless personal area network technology. Such technologies may be combined with the NFC-enabled technology to provide data gathering and user setting optimization with end-user having the ability to control settings and systems of devices such as, without limitation, control circuit 116, processing circuit 128, and the like within apparatus 100 via a software application (i.e., computer program): for instance, and without limitation, an app, including a plurality of customizable settings of apparatus 100.

With continued reference to FIG. 1, in some embodiments, external device 136 may include an NFC reader 152. As used in this disclosure, an "NFC reader" is an external device configured to communicate with NFC chip 144 as described above. NFC reader 152 may support a plurality of radio-frequency (RF) protocols such as, without limitation, Zigbee, Bluetooth Low Energy, Wi-Fi, and the like thereof. In some embodiments, NFC reader 152 may initiate the communication; for instance, and without limitation, NFC reader may send one or more commands to NFC chip 144 within a distance via magnetic field such as, without limitation, command configuring processing circuit 128 to send identification data 132, and/or any processing steps described below in this disclosure. In some embodiments, NFC reader 152 may be capable of writing data into NFC chip 144. In a non-limiting example, NFC reader 152 may be used to write generated unique ID into NFC chip 144. At the point of sale, a reader provided to authorized retailers can unlock the device by placing the device near the reader if age verification was performed. As part of age verification, NFC reader 152 may save the ID of the device and send the ID to the internal company server. First, this allows for age verification at the point of sale to be enforced as a company policy. Secondly, this allows for traceability in the supply chain and counterfeit prevention. More importantly, it allows devices that were sold to minors to be traced back to the retail location and the time of purchase. If this is a consistent pattern of underage usage, this data can be used by the retailer, the company, or the Food and Drug Administration (FDA) to determine if a systemic underage sale problem exists and what action steps are best taken. Additionally, or alternatively, NFC reader may be integrated into user device as described above. In a non-limiting example, NFC reader may be a phone NFC reader embedded within user's mobile device. Such NFC reader may be implemented using a web NFC application programming interface (API) such as, without limitation, NDEFReader interface, wherein the web NFC API is a low-level API that provides sites/apps the ability to read and write to wireless communication device 140 containing NFC chip 144. In such embodiment, user may be able to verify, and/or lock/unlock apparatus 100 autonomously (instead of using the NFC reader at retail store) any time and/or anywhere. Methods of verifying and locking/unlocking are described in further detail below in this disclosure.

Still referring to FIG. 1, NFC reader 152 may be also configured to read usage data of apparatus 100 by communicating with NFC chip 144. In an embodiment, when the apparatus 100 is brought into close proximity with NFC reader 152, NFC chip 144 may send usage data to NFC reader 152 via a wireless signal. NFC reader 152 may process usage data using any computing device within, or communicatively connected to NFC reader 152 such as, without limitation, a remote server as described below. In a non-limiting example, in the case of a reward program, the user may be incentivized to tap apparatus 100 on NFC reader 152 for a recycling reward, providing usage data in a seamless fashion. In another non-limiting example, process of usage data may be used in running a clinical study measuring the actual use of apparatus 100. In other cases, a Bluetooth Low Energy (BLE) with/without MCU may be activated after scanning NFC chip 144 with NFC reader 152, to transmit usage data.

Additionally, or alternatively, NFC reader 152 may be communicatively connected to a remote server 156. As used in this disclosure, a "remote server" is a piece of computer hardware or software (i.e., computer program) that provides functionality for other programs or devices (known as clients). Remote server 156 may provide various functionalities such as sharing data or resources and performing computation among multiple other programs and or devices. Remote servers may include database servers, file servers, mail servers, print servers, web servers, and/or application servers. In an embodiment, remote server 156 may communicate with NFC reader 152 and/or any computing device described in this disclosure through a communication network described above. In a non-limiting example, NFC reader 152 may include a SIM card and is connected to the internet. NFC reader 152 may be configured to transmit received identification data 132 to remote server 156. NFC reader 152 may send a web request to remote server 156, wherein the web request is a type of communication protocol for data transmission made by a client, such as, without limitation, NFC reader 152. Communication protocol may include, but is not limited to, internet protocol (IP), transmission control protocol (TCP), inter-access point protocol, address resolution protocol (ARP), dynamic host configuration protocol (DHCP), file transfer protocol (FTP), internet control message protocol (ICMP), and the like thereof.

With continued reference to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, external device 136 may be configured to store identification data 132, such as, without limitation, user metadata, unique identifier, and the like to a data store 160. In some cases, external device 136 may also be configured to store usage data of apparatus 100. In an embodiment, data store 160 may include a database. In some embodiments, a "data store" may be referred to as a "database." Data store 160 may be implemented, without limitation, as a relational database, a key-value retrieval database such as a NOSQL database, or any other format or structure for use as a database that a person skilled in the art would recognize as suitable upon review of the entirety of this disclosure. Data store 160 may alternatively or additionally be implemented using a distributed data storage protocol and/or data structure, such as a distributed hash table or the like. Data store 160 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in data store may store, retrieve, organize, and/or reflect data and/or records as used herein, as well as categories and/or populations of data consistently with this disclosure. In a non-limiting example, NFC reader 152 may transfer received identification data 132 along with a data received timestamp (i.e., timestamp of when the user purchase apparatus 100) to remote server 156. Remote server 156 may then store identification data 132 and the data received timestamp to data store 160.

With continued reference to FIG. 1, external device 136 may be further configured to post identification data 132, such as, without limitation, user metadata, unique identifier, and the like to an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. In a non-limiting example, remote server 156 may generate a data entry on a decentralized platform, wherein the block may be configured to store unique ID associated with NFC chip 144. A "decentralized platform," as described herein, is a platform or server that enables secure data exchange between anonymous parties. Decentralized platform may be supported by any blockchain technologies. For example, and without limitation, blockchain-supported technologies can potentially facilitate decentralized coordination and alignment of human incentives on a scale that only top-down, command-and-control structures previously could. Decentralized platform may serve as an ecosystem for decentralized architectures such as immutable sequential listing and/or blockchain. In a non-limiting example, remote server 156 may generate a block configured to store unique ID associated with NFC chip 144 and post the block to immutable sequential listing. Unique ID associated with NFC chip 144 stored in the block may be retrieved, by remote server 156 and/or any other computing device, from immutable sequential listing; however, remote server 156 and/or any other computing device may not change, modify, or otherwise update unique ID associated with NFC chip 144 in any way.

With continued reference to FIG. 1, In some embodiments, communication between wireless communication device 140 and external device 136 may be configured to provide real-time end-to-end tracking of products from manufacturing to point of sale of apparatus 100, thereby providing an authentication and tracing mechanism. Additionally, or alternatively, automated supply chain tracking through point-of-sale identification data 132 transmission may be provided to manufacturers of apparatus 100 in order for them to track sales, predict restocking needs of retailers, and anticipate manufacturing volume of such products with the disclosed apparatus 100 and method. Implementation of NFC technology described in this disclosure may have an advantage in that it provides a low-cost solution to boost sales and increase profitability. In a non-limiting example, for both consumer and medical applications, aerosol delivery device with an NFC-enabled, such as, without limitation, apparatus 100, may be configured to 1). trace products in the supply chain, allowing an integrated method of complying with strict medical device supply chain guidelines or regulatory requirements for tracing age-restricted products; 2). verify authenticity of product vis-a-vis counterfeits; 3). monitor sales locations and sales behaviors; 4). assist in re-stocking of products at retail; and/or 5). provide data for consumer/patient behavior. In some embodiments, identification data 132 stored and tracked by remote server 156 may be used for identification of the source and the likelihood of a batch containing faulty devices. In this case, identification data 132 may help link batch, processing, and manufacturing data for future optimization.

With continued reference to FIG. 1, processing circuit 128 is configured to receive an external response 164 from external device 136. As used in this disclosure, an "external response" is a signal received from remote server 156 and/or any computing device in wireless communication with wireless communication device 140 as a response to identification data. External response 164 is generated, by external device 136, as a function of identification data 132. In some embodiments, external response 164 may be generated as a function of a request from wireless communication device 140, such as, without limitation, request for identification data verification. External response 164 may be generated by one or more web APIs. For instance, and without limitation, remote server 156 may include one or more APIs configured to process, analyze, and/or verify identification data 132. In an embodiment, generating external response 164 may include comparing, by remote server 156, identification data 132 with a historical identification data, wherein the historical identification data are pre-saved identification data of apparatus 100 at the point of manufacture. Both historical identification data and identification data 132 may reference the same device. Historical identification data may be stored and/or retrieved from data store 160. For example, and without limitation, unique ID associated with NFC chip 144 may be stored in data store 160 when NFC chip 144 is connected to processing circuit 128 during manufacturing. Remote server 156 may generate external response 164 as a function of the comparison; for instance, and without limitation, if there is historical identification data that matches with identification data 132, remote server 156 may generate an external response containing instructions to unlock apparatus 100, otherwise, remote server 156 may generate an external response containing instructions to lock apparatus 100. In some embodiments, apparatus 100 may be configured to perform age restriction on the use of the device. Aerosol Delivery Devices, including but not limited to vaporizers, heat not burn, nebulizers, metered-dose inhalers, along with other aerosol generating products may require a robust method for age-verification of age restricted products at the point of sale, including enforcement of age verification in many retail locations without reliance on store clerks to enforce checking of IDs. Additionally, the disclosed embodiments provide manufacturers the ability to regulate the sale of nicotine to minors in retail locations such as convenience stores. Additionally, or alternatively, in the scenario where the device delivers prescribed medications such as controlled substances, disclosed embodiments may also serve as an enforcement method to perform "identity verification" of the patient at a pharmacy or anywhere else. In another embodiment, the disclosed embodiments may be configured to track the origin of the aerosol generating device to the point of sale or otherwise investigate how a device was obtained, for regulatory, legal reasons, or otherwise.

With continued reference to FIG. 1, as used in this disclosure, "verification" is a process of ensuring that which is being "verified" complies with certain constraints, for example without limitation system requirements, regulations, and the like. In some cases, verification may include comparing a product, such as without limitation identification data 132, against one or more acceptance criteria. For example, in some cases, identification data 132 may be required to contain user metadata specifying user's age is over 21. Ensuring that identification data 132 is in compliance with acceptance criteria may, in some cases, constitute verification. In some cases, verification may include ensuring that data is complete, for example that all required data types are present, readable, uncorrupted, and/or otherwise useful for processing circuit 128. In some cases, some or all verification processes may be performed by remote server 156. Additionally, or alternatively, as used in this disclosure, "validation" is a process of ensuring that which is being "validated" complies with stakeholder expectations and/or desires. Stakeholders may include users, administrators, property owners, customers, and the like. Very often a specification prescribes certain testable conditions (e.g., metrics) that codify relevant stakeholder expectations and/or desires. In some cases, validation includes comparing a product, for example without limitation identification data 132 against a specification. In some cases, remote server 156 may be additionally configured to validate a product by validating constituent sub-products. In some embodiments, remote server 156 may be configured to validate any product or data, for example without limitation identification data 132. In a non-limiting example, validating identification data 132 such as, without limitation, unique ID associated with NFC chip 144, may include iterating, by remote server 156, immutable sequence listing containing a plurality of unique IDs as described above. Unique ID may be valid if remote server 156 successfully locates and/or retrieves a same unique ID on immutable sequential listing. On the other hand, unique ID may be invalid if remote server 156 failed to locate and/or retrieve same unique ID on immutable sequential listing.

In a non-limiting example, and further referring to FIG. 1, external response 164 may include an HTTP transaction message, wherein the HTTP transaction message may include, without limitation, transaction status (e.g., 200, 300, 304, 500, and the like), response headers, response body, and the like thereof. External device 136 may include an ID reader; for instance, and without limitation, external device 136 may be configured to verify user identification data (i.e., name, date of birth, ID number, and the like) read from the ID reader. External device, such as, without limitation, remote server 156 may include an API configured to perform user identification data verification, wherein the API may be configured to take user identification data such as, without limitation, user metadata, unique ID, and the like as input. Remote server 156 may be configured to generate external response 164 containing a verification datum as a function of input user identification data. As used in this disclosure, a "verification datum" is an element of data related to a result of data verification. In some cases, verification datum may include a data structure containing values representing yes-or-no answers; for instance, and without limitation, verification datum may include value in Boolean data type such as "TRUE" or "FALSE." Remote server 156 may calculate a current age of the users based on received user identification data and compare the current age with an age threshold such as, without limitation, value of 21. External device 136 may generate a verification datum of "TRUE" if current age exceeds age threshold. On the other hand, external device 136 may generate a verification datum of "FALSE" if current age is below age threshold. Such verification datum may be embedded into external response 164; for instance, and without limitation, remote server 156 may write verification datum into the response body of external response 164. External device 136 may be further configured to output and/or transmit external response 164 containing verification datum to wireless communication device 140. User may be valid (>21) if and only if external response containing a transaction status of 200 and "TRUE" as verification datum, while external response containing a transaction status of 300 and a verification datum with "FALSE" value may indicate an invalid user (<21).

With continued reference to FIG. 1, processing circuit 128 is configured to modify an internal state 168 of apparatus 100 and/or processing circuit 128 as a function of external response 164. "Modify," as described in this disclosure, means change, update, or otherwise modify, by processing circuit 128, internal state 168 based on external response 164. For instance, and without limitation, processing circuit 128 may change internal state 168 according to transaction status and/or response body of external response 164 as described above. As used in this disclosure, an "internal state" is a value representing an internal property, attribute, or otherwise a status of processing circuit 128. Internal state 168 may include binary states. A "Binary state," for the purpose of this disclosure, is a state in which only two values are possible, in which processing circuit 128 may only have one or the other at a time. In some embodiments, internal state 168 of processing circuit 128 may include a first binary state and a second binary state. Modifying internal state of processing circuit 128 may include switching internal state 168 between first binary state and second binary state. In a non-limiting example, internal state 168 of processing circuit 128 may be represented in Boolean algebra. At any given moment, every terminal of processing circuit 128 may be in one or the two binary states; for instance, and without limitation 0 (i.e., FALSE) or 1 (i.e., TRUE).

Still referring to FIG. 1, in some embodiments, processing circuit 128 may be implemented in a way consistent with a state machine. As used in this disclosure, a "state machine" is a mathematical abstraction used to design algorithms, such as, without limitation, any processing step described in this disclosure. State machines may be constructed by logic gates. In some cases, logic gates may include, without limitation, OR gate, AND gate, NOT gate, NAND gate, NOR gate, EXOR gate, EXNOR gate, and the like thereof. One skilled in the art, after having reviewed the entirety of this disclosure, will recognize various logic gates that may be employed by processing circuit 128. State machine may read a set of inputs such as, without limitation, external response 164 and change to a different state, such as, without limitation, internal state 168, based on the inputs. External response 164 may be the form of signal as described above. State machine may accept and process such external response 164, and/or match external response 164 to an internal state. For instance, and without limitation, processing circuit 128 may be configured to determine internal state 168 such as, without limitation, first internal state, or second internal state, based on signal frequency (Hz) of external response 164. In an embodiment, state machine may include a deterministic finite state machine, wherein the deterministic finite state machine is a type of state machine which allows only one possible transition for a given input. A "transition," as described herein, is a set of actions to execute when a condition is fulfilled, and/or an event received. Actions may include any processing steps described in this disclosure. In a non-limiting example, processing circuit 128 with deterministic finite state machine may be configured to perform "if-else" statement. Processing circuit 128 may include an initial internal state, wherein the initial internal state is a default state which may be either first binary state or second binary state. Upon receiving external response 164, deterministic finite state machine may be configured to change initial internal state to other internal state based on external response 164; for instance, and without limitation, deterministic finite state machine may change initial internal state of 0 to state of 1 if transaction status is 200 and keep initial sternal state of 0 otherwise. Additionally, or alternatively, internal state 168 of processing circuit 128 may include more than two states. In a non-limiting example, internal state 168 may include three states such as "00," "01," and "11" (i.e., FALSE, NATURAL, and TRUE).

Figure 8:
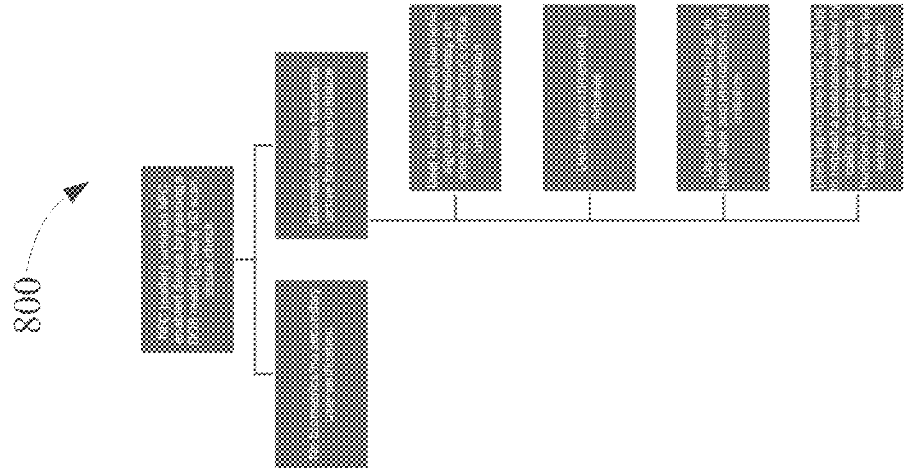
FIG. 8 shows exemplary embodiments of activating an apparatus for biometric access controls.

Still referring to FIG. 1, in some cases, instead of just locking and unlocking apparatus 100 as described above based on the external response 160, processing circuit 128 may be programed to activate technology such as a biometric sensor described herein to collect biometric data, such as described herein, for example with reference to FIG. 8. In an embodiment, biometric data may include unique and measurable traits of the user which may be used to verify user's identity and grant access to apparatus 100 (with control circuit 116 enabled). In a non-limiting example, biometric sensor may include any device that integrates fingerprint scanner, facial recognition solution, voice recognition, iris scans, palm prints, hand geometry, and/or the like to limit only authorized users from using apparatus 100 for the delivery for certain active ingredients. Apparatus 100 and/or biometric sensor 124 may be activated at the point of sale (using NFC reader 148), after verifying user ID (i.e., sending identification data), a limited time window to enter user biometric data using biometric sensor on apparatus 100 is given to the authorized purchaser (in some cases, authorized purchaser may be the user); apparatus 100 and/or biometric sensor 124 may need to be reactivated at a point of sale (using NFC reader 148 again) to limit aftermarket sale if such a window expires without receiving biometric data. However, user within a specific amount of time uses a finger, for example, and without limitation, a thumb on one hand, biometric sensor such as a finger printer scanner may be configured to take shots from a few angles to collect as much reference biometric data as possible. Such reference biometric data may then be used to reactive apparatus 100 (either per inhalation, or for a specific amount of time) for the authorized user at a later time.

Continuing to refer to FIG. 1, processing circuit 128 may include at least one sensor configured to detect sensor data. As used in this disclosure, "sensor" is a device or module that detects and responds to some type of input from the physical environment. In exemplary embodiments, at least one sensor may include a temperature sensor, an optical sensor, a photodector, a humidity sensor, a pressure sensor, an accelerometer, a noise sensor, an airflow sensor disposed within a mouthpiece, such as mouthpiece described herein, a capacitive sensor, a gyroscope, an inductive sensor, Light Detection and Ranging (LIDAR), and the like. Additionally, or alternatively, processing circuit 128 may be configured to activate biometric sensor 124 based on the received sensor data. For example, at least one sensor may include a pressure sensor, pressure sensor may be configured to detect pressure data indicating when biometric sensor 124 is depressed by a user and/or not depressed by a user and processing circuit 128 may be configured to activate biometric sensor based on the detected pressure data indicating depression of the biometric sensor. Additionally, or alternatively, at least one sensor may comprise a temperature sensor, temperature sensor may be configured to detect a temperature change and/or an increase in a rate of change of temperature and processing circuit 128 may be configured to activate biometric sensor 124 based on the detected change in temperature and/or rate of change of temperature. As a non-limiting example, this sensor measures the temperature rate of change when a user places a finger on the scanner. A rate of change indicates the presence of a user and the fingerprint scanner activates. This may replace a press activated sensor for increased convenience. Further, additionally, or alternatively, at least one sensor may include one of an optical sensor and/or a photodetector, each of the optical sensor and/or photodetector may be configured to detect a change in light and activate biometric sensor based on the detected change in light. Optical sensors (e.g. beam sensor, retro-reflective sensors, diffuse reflection sensors) may be able to detect a placement of a finger and activates fingerprint scanner, rather than or in addition to a button. In another embodiment, a pressure sensors may be used to capture the increased force on the fingerprint scanner through the placement of finger on the board, or instead, the internal pressure sensor that acts are starting the aerosol delivery mechanism, also doubles in detecting a user inhalation and change in pressure internally to activate the fingerprint scanner. In another embodiment, a humidity sensor on or near the mouthpiece may be used to provide breath based or mouth moisture readings, and trigger the activation of the fingerprint scanner. In another embodiment, an audio sensor may be used to detect voice commands or keywords, and then activate the fingerprint scanner. In another embodiment, a strain sensor may be employed to measure the deformation on the fingerprint scanner or a coating on top of fingerprint scanner when the user places a finger on it to activate the biometric sensor. In another embodiment, a capacitive sensor may detect a user's finger moving close to the fingerprint scanner without physical contact. The finger would disrupt the electrical field emitted by the capacitive sensors, and upon disruption, activate the fingerprint scanner. In another embodiment, a gyroscope or an inductive sensor with an inside metal ball inside or two contacts and a metal ball inside may be used to only allow for a specific orientation or change in orientation to activate the fingerprint scanner for users to activate the device (e.g. turning the device upside down and back). In another embodiment, a camera and facial recognition software may track if a device is moving towards a user's face and then activate the fingerprint scanner. Furthermore, additionally, or alternatively, at least one sensor may include an accelerometer configured to detect movement of the apparatus and activate biometric sensor 124 based on the detected movement of the apparatus 100, or a specific gesture used to activate the biometric sensor.

With further reference to FIG. 1, processing circuit 128 may include a user interface configured to receive a user input. As used in this disclosure, "user interface" is a component configured to allow interaction between a user and apparatus 100. For example, user interface may include a keypad configured to receive a personal identification number (PIN), a touch user interface configured to receive a user touch pattern such as drawing and/or swipe movements, and the like. In an embodiment, when apparatus 100 is activated at the point of sale (using NFC reader 148), apparatus 100 may prompt user to input a first user input using the user interface, processing circuit 128 may be configured to receive the first user input and store first user input as a reference user input. Additionally, or alternatively, processing circuit 128 may be configured to receive a second user input, compare the second user input to the reference user input, and activate apparatus 100 and/or biometric sensor 124 based on match in comparing the second user input and the reference user input.

Still referring to FIG. 1, additionally, or alternatively, once the biometric sensor 124 is activated, processing circuit 128 is configured to receive second biometric data, compare the second biometric data to the reference biometric data, and modify internal state 168 based on match in comparing the second biometric data and the reference biometric data. Modifying internal state 168 may be consistent with any modification of an internal state described herein.

With continued reference to FIG. 1, processing circuit 128 is configured to determine a device usability 172 as a function of modified internal state 168. As used in this disclosure, a "device usability" refers to a degree to which user may use apparatus 100's primary or secondary functions; for instance, and without limitation, vaping using apparatus 100. In some embodiments, device usability 172 may include what functionalities of apparatus 100 user may use and/or may not use. In some cases, functionalities of apparatus 100 may include, without limitation, powering on/off, initiating/terminating vaporization of aerosolizable material, configuring aerosol generation mechanism (i.e., adjusting temperature), changing aerosolizable material, and the like thereof. In some embodiments, processing circuit 128 may determine a device usability based on first internal state such as, without limitation, state of "0," wherein the device usability may determine that apparatus 100 does not have any functionalities described above. Processing circuit 128 may determine a device usability based on second internal state such as, without limitation, state of "1," wherein the device usability may determine that apparatus 100 has all of the functionalities described above. In other embodiments, device usability 172 may determine usability of at least a portion of functionalities described above; for instance, and without limitation, apparatus 100 containing processing circuit 128 with internal state such as first binary state may still be able to power on and off, however, apparatus 100 may not be able to start vaporization of aerosolizable material. In a non-limiting example, device usability 172 may globally determine a state of operation of apparatus 100. Additionally, or alternatively, determination of device usability 172 may be described in more detail with reference to FIG. 9.

With continued reference to FIG. 1, processing circuit 128 is configured to configure control circuit 116 as a function of device usability 172. In some embodiments, configuring control circuit 116 may include disabling control circuit 116 as a function of device usability 172. In a non-limiting example, disabling control circuit 116 may include disconnecting one or more connections between elements, components, and/or devices within apparatus 100 that are connected to control circuit 116. For instance, and without limitation, disabling control circuit 116 may include cutting off power supplies for aerosol generation mechanism 120 such as, without limitation, heating element, from power source 108; therefore, shut off vaporization feature of apparatus 100. In a non-limiting example, control circuit 116 may include a relay. As used in this disclosure, a "relay" is an electrically operated switch. Relay may include a set of input terminals for a single or multiple control signals such as, without limitation, external response(s) 160. In some embodiments, relay may include one or more contacts in multiple contact forms, such as, without limitation, make contacts, break contacts, or combinations thereof. In some embodiments, contacts may be close or open through electromagnet, semiconductor, and the like thereof. Processing circuit 128 may configure relay within control circuit 116 to break the contact between one or more elements, components, and/or devices with power source 106; for instance, and without limitation, the contact between power source 108 and heating element of aerosol generation mechanism 120. In other embodiments, configuring control circuit 116 as a function of device usability 172 may include enabling control circuit 116 as a function of device usability 172. In a non-limiting example, enabling control circuit 116 may include connecting and/or reconnecting one or more connections between elements, components, and/or devices within apparatus 100 that are connected to control circuit 116. For instance, and without limitation, enabling control circuit 116 may include reconnecting power source 108 with aerosol generation mechanism 120. User may then start vaporization process of aerosolizable material using apparatus 100. In a further non-limiting example, processing circuit 128 may be configured to lock and unlock apparatus 100, using control circuit 116 and processing steps described above, at the point of purchase. Processing circuit 128 with wireless communication device 140 with NFC chip 144 may be integrated into the bottom of apparatus 100 inside of outer body 104. Additionally, or alternatively, processing circuit 128 may be configured to be on/off based on device usability 172. In a non-limiting example, processing circuit 128 may be completely turned off based on device usability 172 determined based on external response 164 containing data indicate apparatus 100 belongs to a defective batch. Elements of processing circuit 128, such as, without limitation, microcontroller, memory, and the like may be locked when processing circuit 128 is off. Apparatus 100 may only be activated when NFC chip 144 receives external response 164 containing instructions to unlock elements of processing circuit 128, for example, and without limitation, the microcontroller. In a non-limiting example, external response 164 may include a recall message, generated and/or issued by remote server 156 based on identification data 132, wherein the recall message is a message indicating a device recall (i.e., request to return, exchange, or replace apparatus 100) determined by manufacturer; for instance, and without limitation, device recall may be issued when manufacturer discovers defects of apparatus 100 that could hinder performance, harm consumers, or produce legal issues for the producers. For any device with at least a portion of identification data 132 that matches data within predetermined identification data (i.e., identification data of device in a defective batch) stored in remote server 156 may receive external response 164 with recall message as response body, control circuit 116 may be locked, by processing circuit 128, in response to such external response 164.

Referring now to FIGS. 2A-2H, an exemplary embodiment 200 of outer body 204 of aerosol delivery device is illustrated. Outer body 204 may encapsulate internal elements, components, and/or devices described herein, such as, without limitation, power source 108, aerosolizable material reservoir 112, control circuit 116, aerosol generation mechanism 120, processing circuit 128, and the like thereof. In some embodiments, outer body 204 may include a variety of shapes. In some cases, outer body 204 may include a flat cylinder shape. In a non-limiting example, outer body 204 may be designed in a shape comparable to an actual cigarette. In some embodiments, outer body 204 may include an upper shell and a lower shell configured to be removably coupled to each other. In a non-limiting example, outer body 204 may be detachable from a cartridge, wherein the cartridge may include one or more internal elements, components, and/or devices. In an exemplary embodiment, cartridge may be any cartridge as described in U.S. patent application Ser. No. 18/410,193, filed on Jan. 11, 2024, and entitled "APPARATUS AND METHOD FOR PREVENTING YOUTH ACCESS AND COUNTERFEIT AEROSOL DELIVERY," which its entirety is incorporated herein by reference. Outer body 204 may include a mouthpiece 208 at first end of outer body 204. In some embodiments, mouthpiece 208 may be located on an opposite end to bottom 212 that is at a second end of outer body 104. Mouthpiece 208 may be an element of apparatus 200 through which a user inhales vapor, as described above. In some embodiments, mouthpiece 208 may include an aperture through which vapor is drawn when a user inhales, a passage through which vapor passes to the aperture, one or more inlets to permit passage of air through mouthpiece 208, and/or any other suitable feature. Mouthpiece 304 may be tapered or otherwise shaped to fit in a user's mouth with ease and comfort.

With continued reference to FIGS. 2A-2H, in a non-limiting example, bottom 212 of outer body 104 may include a charging connector, wherein the charging connector may include any circuit or circuit element by means of which electric power may be transferred from an external power source to power source, such as power source as described above. For instance, and without limitation, charging connector may include an inductive charging coil whereby electrical power is transferred to the inductive charging coil using a varying exterior magnetic field supplied by another device or a conductive connection from the apparatus to an exterior device. A non-limiting example of a conductive connection may include two or more charge contacts, which may be constructed of conductive material and accessible from an exterior surface of outer body 104, such as, without limitation, bottom 212. Charge contacts may be in electrical communication with a power source disposed inside of outer body 204; charge contact pins may be visible on the exterior of outer body 204. When apparatus 200 is connected to an external power source, charging pins may facilitate electrical communication between the power source inside of apparatus 200 and the external power source. Charging pins may be electrically connected to power source via any suitable connection; for instance, and without limitation, charging pins may contact one or more conductive elements including springs, clips, and/or a printed circuit board (PCB). Charging pins may include male and/or female connectors; for instance, charging pins may include a "plug" that projects from bottom 212 of outer body 104 or may include holes into which a plug or one or more projecting conducting pins may be inserted. Additionally, or alternatively, charging connector on bottom 212 may include a magnetic contact.

Additionally, or alternatively, and still reference to FIGS. 2A-2H, outer body 204 may be configured to receive an end-cap. As used in this disclosure, an "end-cap" is a removable cover element that covers an end of outer body 204. In a non-limiting example, end-cap may close off mouthpiece 208 at first end of outer body 204. End-cap may be removably attached to outer body 204 in any suitable manner, including without limitation a press-fit, snap fit, adhesion, fusion, fastening, or the like; end-cap may be formed as an integral portion of outer body 204.

With continued reference to FIGS. 2A-2H, in some embodiments, a status indicator 216 may be disposed on any surface of outer body 204. As used in this disclosure, a "status indicator" is an element (or multiple elements) that continuously indicates one or more status of apparatus 200. Status of apparatus 200 may include, without limitation, internal state of processing circuit, state of power source, state of aerosol generation mechanism, state of biometric sensor, and the like, as described herein. In some embodiments, status indicator 216 may include a passive status indicator, wherein the passive status indicator may be a status indicator 216 with physical configurations on outer body 104 which enables one or more indications of current apparatus state. In a non-limiting example, passive status indicator may be disposed on a surface of outer body 204 with a portion of the surface is transparent and/or hollow. User may observe elements, components, or otherwise devices inside outer body 204 through such portion of the surface (i.e., passive status indicator) to know status of apparatus 200. For instance, and without limitation, status indicator 216 may include a liquid fill level indicator, wherein the liquid fill level indicator may passively allow user to acknowledge the amount of aerosolizable material remaining within aerosolizable material reservoir, as described above, by disposing liquid fill level indicator on the surface of outer body 204 that right above aerosolizable material reservoir. In other embodiments, status indicator 216 may include an active status indicator, wherein the active status indicator may be a status indicator 216 with electrical configurations inside outer body 204 which enables one or more indications of current apparatus state. In a non-limiting example, active status indicator may include an indicator light located on outer body 204. Indicator light may include any light-emitting electronic component, including without limitation a light-emitting diode (LED). Continuing the non-limiting example, liquid fill level indicator may include an LED configured to indicate a detected liquid fill level of aerosolizable material reservoir by illuminating various color of lights; for instance, and without limitation, liquid fill level indicator may illuminate green light when aerosolizable material reservoir is at full capacity and illuminate red light when aerosolizable material at low capacity. In other embodiments, active status indicator may also indicate, without limitation, a charging status of apparatus 200; for instance, and without limitation, indicator light of active status indicator may emit light while the apparatus 200 is charging, and cease illumination when charging is complete. Indicator light of active status indicator may emit a first color of light while charging is occurring and a second when charging is complete, may blink to indicate charging is currently occurring, or the like. Any suitable pattern of illumination in response to charging status of apparatus 200 may be used. In another non-limiting example, active status indicator may indicate device usability, as described above. Indicator light of active status indicator may emit, without limitation, color "green" when control circuit is enabled, and color "red" when control circuit is disabled. In another non-limiting example, active status indicator may indicate biometric sensor usability, as described herein. Indicator light of active biometric sensor 220 may emit, without limitation, color "green" when biometric sensor 220 is enabled, color "red" when biometric sensor 220 is disabled, or color "blue" when biometric sensor 220 is ready to be initialized by a user's biometric trait. Without limitation, the initialization indicator may blink to show it is active and show biometric imprinting is successfully underway during initialization (e.g. by a short blue light blinking during initializations). Without limitation, the status indicator can assist the user to determine whether their initialization is complete; by means of example from changing from a blinking blue light to a longer duration green light. In an embodiment, biometric sensor 220 may be any biometric sensor described herein. Further, a secondary indicator may indicate to the user that initialization was successful that after the initialization/imprinting steps uses a haptic feedback mechanism through a vibration motor to alert the user the device is ready for use. Further a secondary indicator such as a haptic feedback mechanism may alert the user that a prespecified time period that allowed the user access to the device has elapsed or that a prespecified number of inhalations after activation has been reached, asking the user to re-verify themselves.

With continued reference to FIGS. 2A-2H, additionally, or alternatively, a biometric sensor housing 224, described in more detail below, may be disposed on outer body. Biometric reader housing 224 may include a biometric reading window 228 disposed on biometric reader cover 232. As used in this disclosure, a "biometric reading window" is a designated area or surface on outer body 104 of apparatus wherein a biometric sensor such as any biometric sensor as described in this disclosure is located or integrated. In a non-limiting example, biometric reading window 228 may be recessed into outer body 204 and/or biometric reader cover 232, creating a raised or flush surface. Biometric reading window 228 may enable user to interact with biometric sensor 220 through outer body 204, allowing biometric sensor 220 to capture and measure specific physiological or behavior characteristics of the user. In some cases, biometric sensor 220 may include a fingerprint scanner, wherein the fingerprint scanner may be configured to capture at least a portion of user fingerprint (i.e., one or more unique patterns of ridges and valleys present on user's fingertip) and communicate with MCU to verify the user's identity and authenticate access to apparatus 200. In some cases, the size of biometric reading window 228 may be sufficient to accommodate the specific biometric sensor being used. For example, and without limitation, fingerprint sensor may require a smaller window than a facial recognition sensor. In some cases, size and/or location of biometric reading window may be determined based on ergonomic requirements for ease of use and comfort during normal operation of apparatus 200. In some cases, the surface of biometric reading window 228 may be smooth and free from any imperfections that might interfere with biometric sensor ability to capture accurate biometric data; for instance, and without limitation, surface of biometric reading window 228 may include an oleophobic coating (applied to the sensor surface to reduce the adhesion of oils, dirt, fingerprints, and/or the like). Additionally, or alternatively, biometric reading window 228 may be incorporated into other functional elements such as, without limitation, a power button, status indicator 216, or the like, described herein. Additionally, or alternatively, biometric reading window 228 has a seal surrounding it to prevent the ingress of moisture from a user's hand into the device and creating issues with the electronics. In an embodiment, seal for biometric reading window 228 may include a compression seal, gasket such as an o-ring, hermetic seal, labyrinth seal, radial shaft seal, and the like.

Continuing to refer to FIGS. 2A-2H, in some embodiments, biometric sensor 220 may include a biometric sensor status indicator 236. As used in this disclosure, a "biometric sensor status indicator" is an element that continuously indicates one or more statuses of biometric sensor 220. Status of biometric sensor 220 may include, without limitation, an activated state of biometric sensor, a deactivated state, and the like, as described herein. In some embodiments, biometric sensor status indicator 236 may include an active status indicator, wherein the active status indicator may be a status indicator 216 with electrical configurations on biometric sensor 220 which enables one or more indications of a current state of biometric sensor 220. In a non-limiting example, active status indicator may include an indicator light located on biometric sensor 220. Indicator light may include any light-emitting electronic component, including without limitation a light-emitting diode (LED). Any suitable pattern of illumination in response to status of biometric sensor 220 may be used. In another non-limiting example, active status indicator may indicate biometric sensor 220 usability, as described above. Indicator light of active status indicator may emit, without limitation, color "green" when biometric sensor is activated, and color "red" when biometric sensor is disabled, and the like. In an embodiment, biometric sensor 220 may be any biometric sensor described herein. In another embodiment, the status indicator may consist of a countdown, indicating time left for the user to initialize or for the usage window/inhalations that are still usable before a new unlock is required.

Still referring to FIGS. 2A-2H, biometric reader cover 232 may include a biometric sensor status window 240 disposed on biometric reader cover 232. As used in this disclosure, a "biometric sensor status window" is a designated area or surface on outer body 104 and/or biometric reader cover 232 wherein a biometric sensor status indicator such as any biometric sensor status indicator as described in this disclosure is located or integrated and allows a user to observe a status of biometric sensor 220. In a non-limiting example, biometric sensor status window 240 may be recessed into outer body 204 and/or biometric reader cover 232, creating a raised or flush surface.

With continued reference to FIGS. 2A-2H, biometric sensor housing 224 may include a biometric sensor cavity 244 configured to receive biometric sensor 220. Biometric sensor cavity 244 may be formed in outer body 204. In an embodiment, biometric sensor may be formed in an upper shell and a lower shell configured to be removably coupled to each other. In an embodiment, biometric sensor cavity 244 may be a substantially rectangular shape, substantially circular shape, and/or the like. Additionally, or alternatively, biometric sensor cavity may be shaped substantially similarly to a shape of biometric sensor 220. In an embodiment, biometric sensor cavity 244 may be sized and configured to allow biometric sensor 220 to be depressed from a first position where biometric sensor is coplanar with outer body 204 and/or biometric reading window 228 into a second position within biometric sensor cavity 244 where biometric sensor 220 is pressed into outer body 204, such as shown in an embodiment shown in FIGS. 2G and 2H. Additionally, biometric sensor 220 may be configured to be depressed into biometric sensor cavity 244 by a user while biometric data is received by biometric sensor. Additionally, or alternatively, a pressure sensor may be used to detect when biometric sensor 200 is pressed into a second position and biometric sensor 220 may be activated, such as described herein, such as shown in an embodiment shown in FIGS. 2G and 2H.

Still referring to FIGS. 2A-2H, additionally, or alternatively, a resistance member may be disposed within biometric sensor cavity 244 that is configured to return biometric sensor from a second position back to first position, as described above. As used in this disclosure a "resistance member" is an elastic object that stores and/or exerts mechanical energy. Resistance member may be composed of a spring steel. As used in this disclosure "spring steel" is steel that is capable of returning to an original shape after displacement, deflection, and/or twisting. As a further non-limiting example, spring may be comprised of alloy steel, carbon steel, cobalt-nickel, copper based alloy, nickel based alloy, stainless steel, and/or titanium. Additionally or alternatively, spring may be composed of a non-ferrous material such as phosphor bronze, beryllium copper, and the like thereof.

Still referring to FIGS. 2A-2H, spring may be comprised of one or more non-metal compositions. For example, and without limitation, spring may be comprised of an elastic polymer. As used in this disclosure an "elastic polymer" is a thermoplastic elastomer that is capable of storing and/or exerting a mechanical force. For example, and without limitation, an elastic polymer may include polycarbonate, acetal copolymer polyoxymethylene, acetal homopolymer polyoxymethylene, acrylic, nylon, polyethylene, polypropylene, polystyrene, and the like thereof. Elastic polymers may include a corrosion resistant material that may aid in extending the usage time of the spring.

Continuing to reference FIGS. 2A-2H, biometric sensor cavity 244 may include alignment rails 248. In an embodiment, biometric sensor cavity may include an alignment rail 248 formed along each side of biometric sensor cavity 244. Additionally, or alternatively, alignment rail 248 may extend along a portion or an entire length of each side of biometric sensor cavity 244. In an exemplary embodiment, biometric sensor cavity 244 may include an alignment rail 248 that extends along an entire perimeter of biometric sensor cavity 244. Further, additionally, or alternatively, alignment rail 248 may include an alignment feature 252. In an embodiment alignment rail 248 may include a plurality of alignment features 252 formed on alignment rail 248. Alignment features 252 may be a substantially rectangular shape, a substantially triangular shape. Alignment rail 248 and alignment features 252 may be configured to ensure the proper positioning and orientation of components, for example biometric sensors described herein, within an apparatus, such as apparatuses described herein. Alignment rail 248 and alignment features 252 may be useful to ensure functionality, reliability, and performance of biometric sensor 220, apparatus described herein, and the like.

With further reference to FIGS. 2A-2H, biometric sensor cavity 244 may include wiring aperture 256. Additionally, or alternatively, wiring apertures extend through outer body 204 to allow for wiring from biometric sensor 220 to pass through and connect with other components in apparatus 200. In an embodiment, wiring aperture 256 may be positioned to allow wiring associated with biometric sensor 220 to easily pass through outer body 204 without the need for extra wiring. Further, wiring apertures 256 may be sized based on the wiring to be accommodated by wiring apertures. In a further embodiment, additionally, or alternatively, wiring apertures 256 may be sealed using adhesive, plastic, and/or another suitable material once wiring is passed through wiring apertures 256. In an embodiment, reader cover 232 may be integrally formed within outer body 204 without the need for a separate component; the assembly of the electronics and biometric scanner 220 is done in advance and inserted into the outer body 204.

Figure 2A:
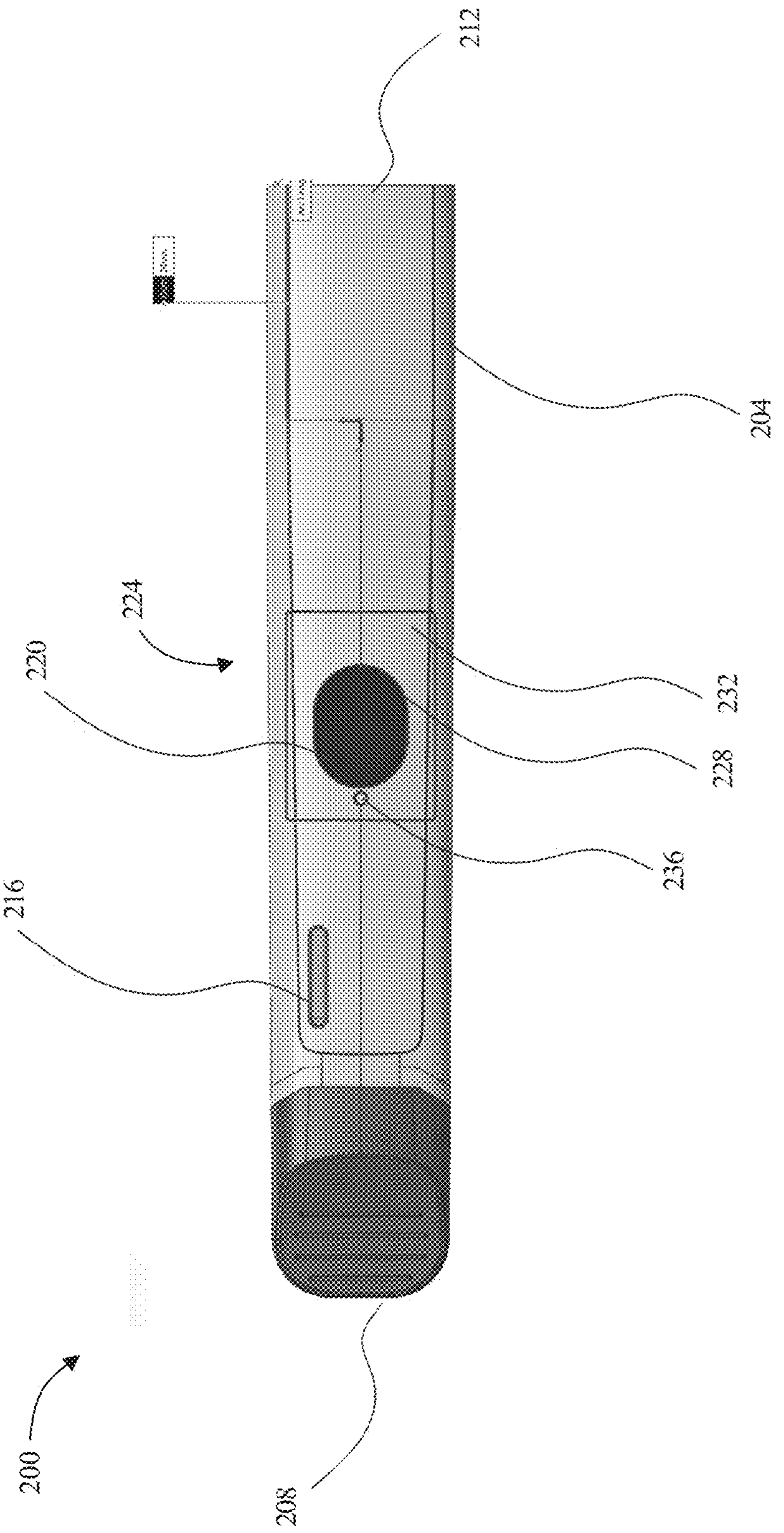
FIG. 2A is a perspective view of an exemplary embodiment of an outer body of an apparatus for biometric access control.
Figure 2B:
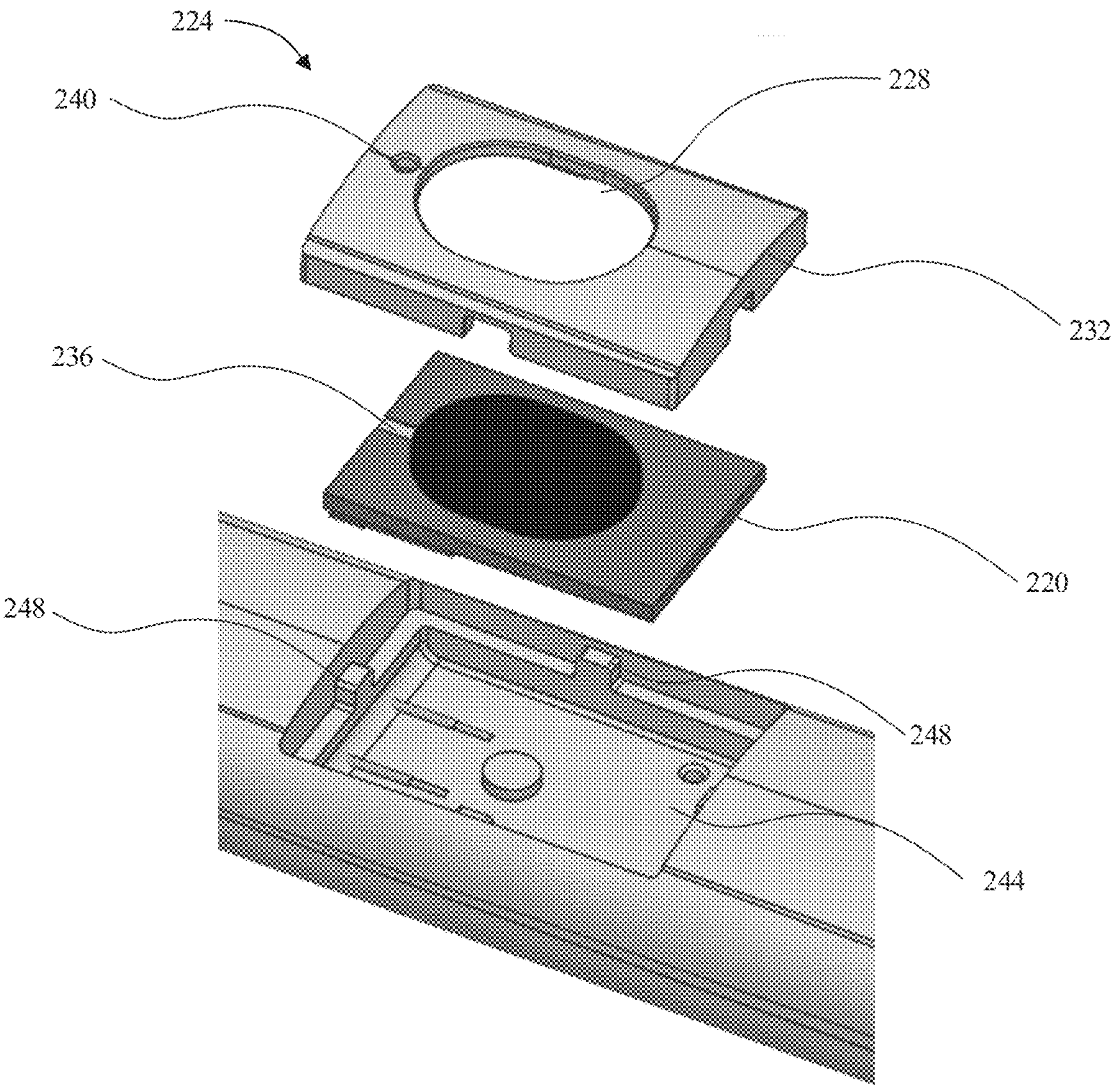
FIG. 2B is an exploded view of an exemplary embodiment of an outer body of an apparatus for biometric access control.
Figure 2C:
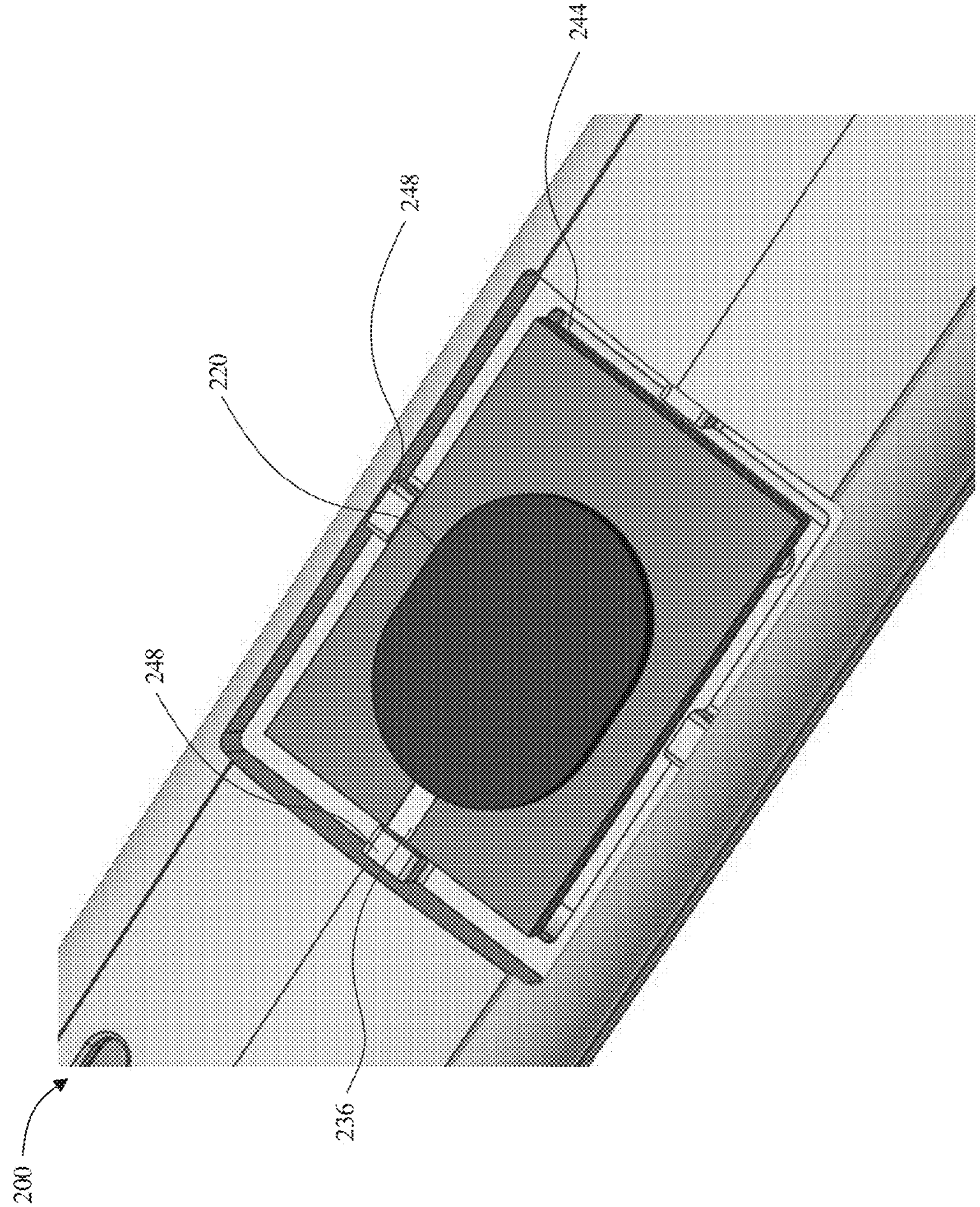
FIG. 2C is a first detailed view of an exemplary embodiment of an outer body of an apparatus for biometric access control.
Figure 2D:
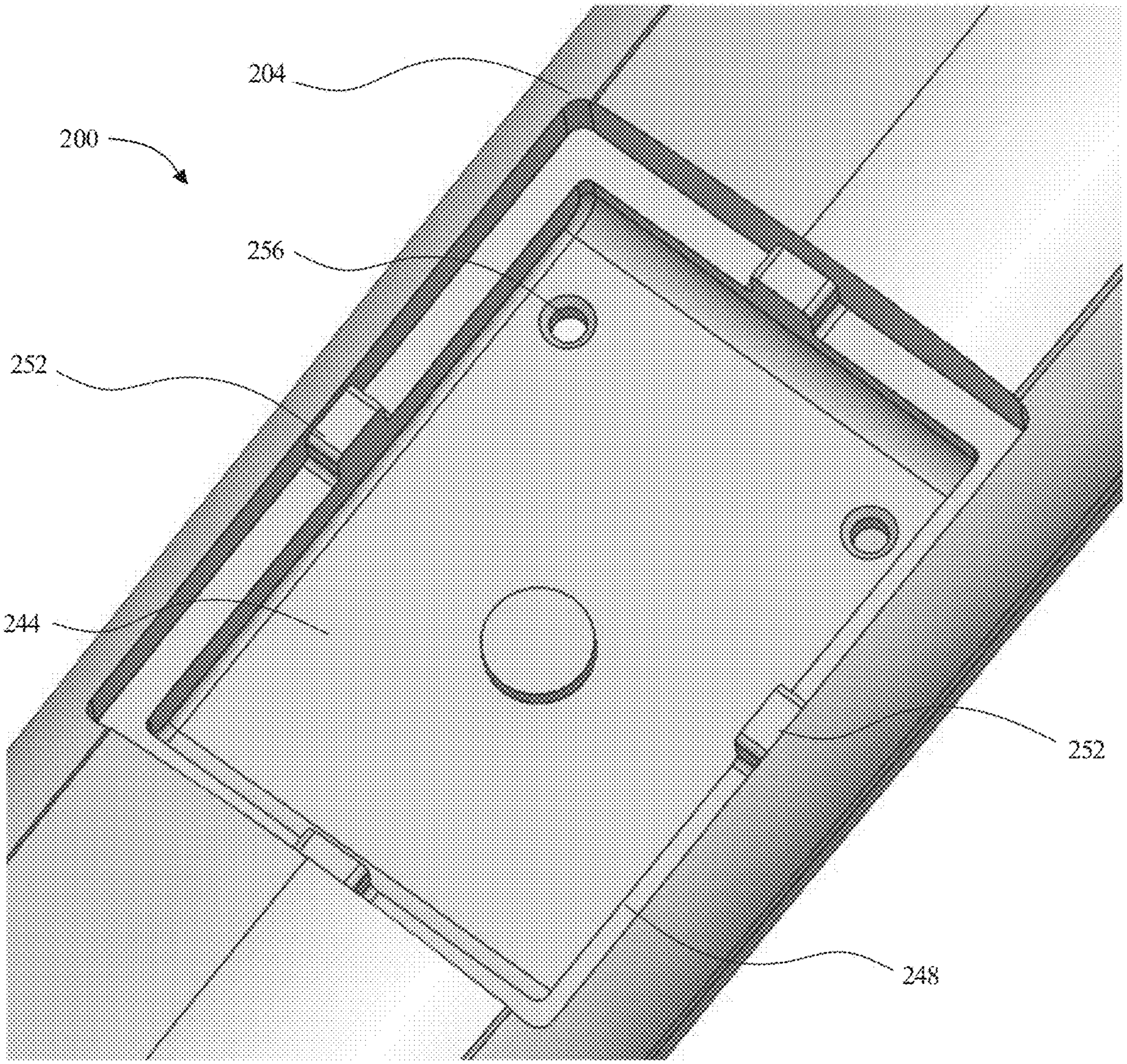
FIG. 2D is a second detailed view of an exemplary embodiment of an outer body of an apparatus for biometric access control.
Figure 2E:
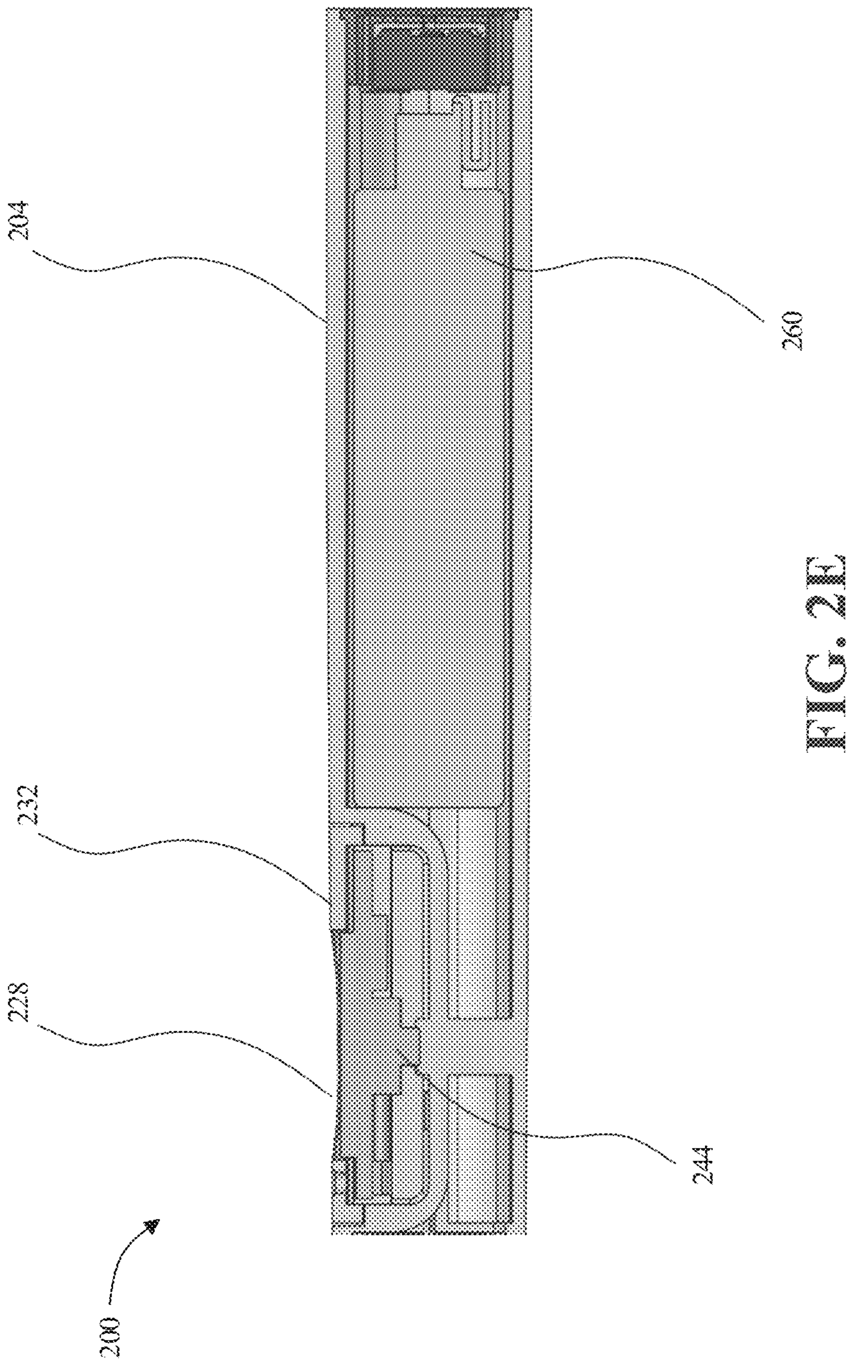
FIG. 2E is a first cross sectional view of an exemplary embodiment of an outer body of an apparatus for biometric access control.
Figure 2F:
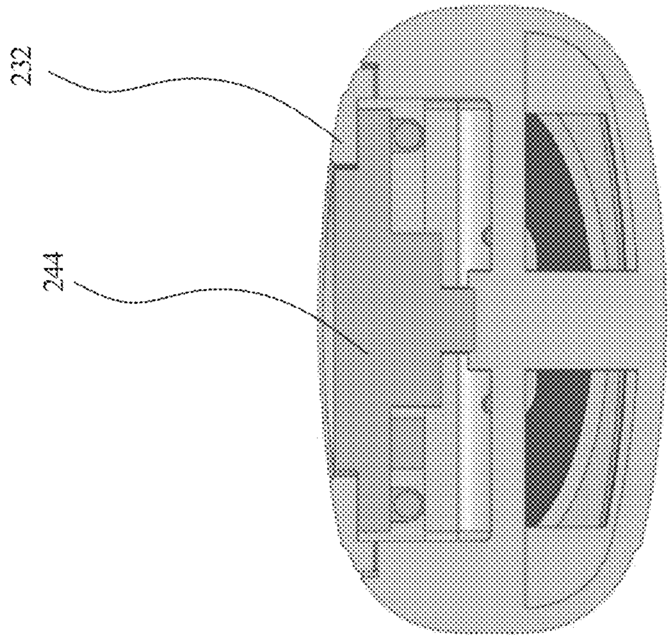
FIG. 2F is a second cross sectional view of an exemplary embodiment of an outer body of an apparatus for biometric access control.
Figure 2G:
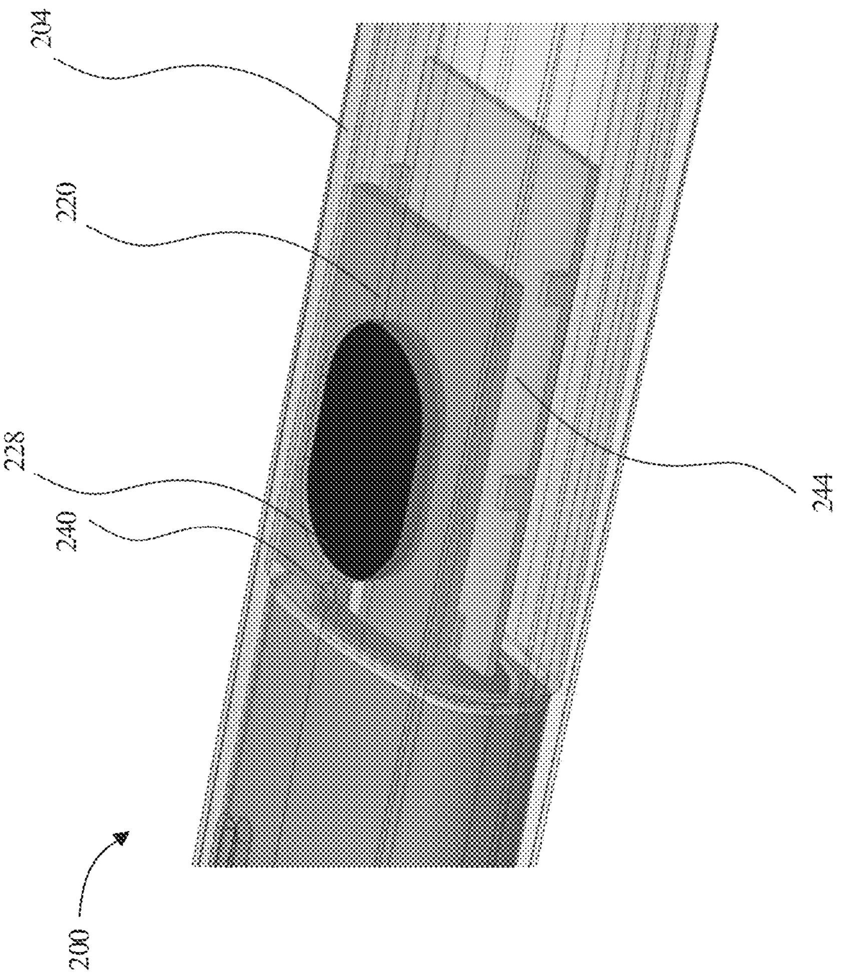
FIG. 2G is a perspective view of an exemplary embodiment of an exemplary embodiment an apparatus for biometric access control.
Figure 2H:
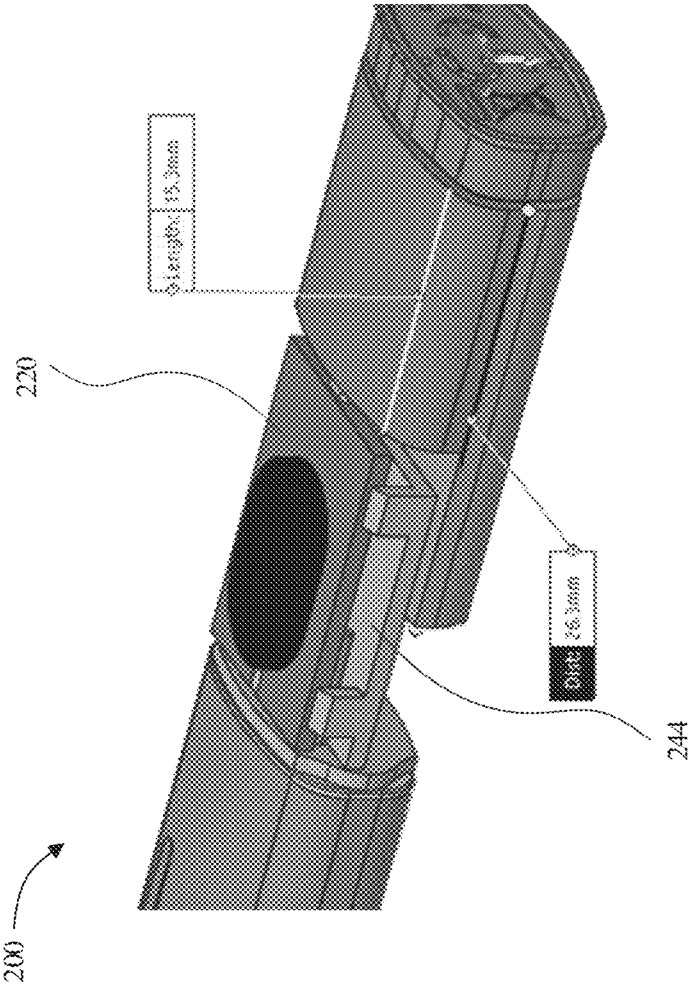
FIG. 2H is a perspective view of an exemplary embodiment of an exemplary embodiment an apparatus for biometric access control.

As shown in FIG. 2E, biometric sensor cavity 244 may be separated from internal cavity 260. In an embodiment, internal cavity 260 may be configured to house components described herein other than biometric sensor 220.

Figure 3C:
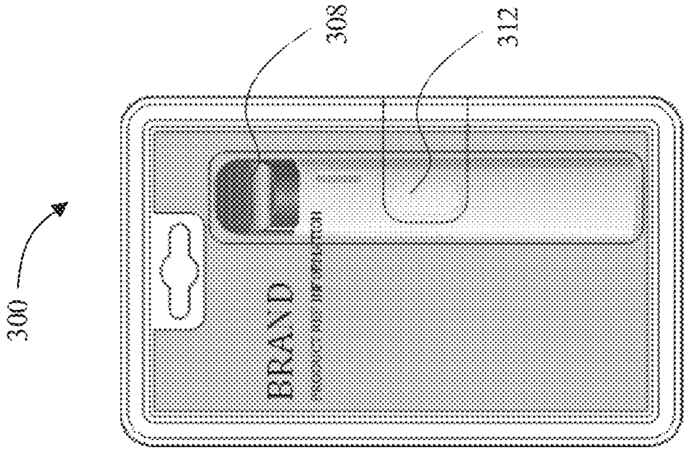
FIGS. 3A-3C are perspective views of an exemplary embodiment of a packaging for a consumer aerosol delivery device.
Figure 3B:
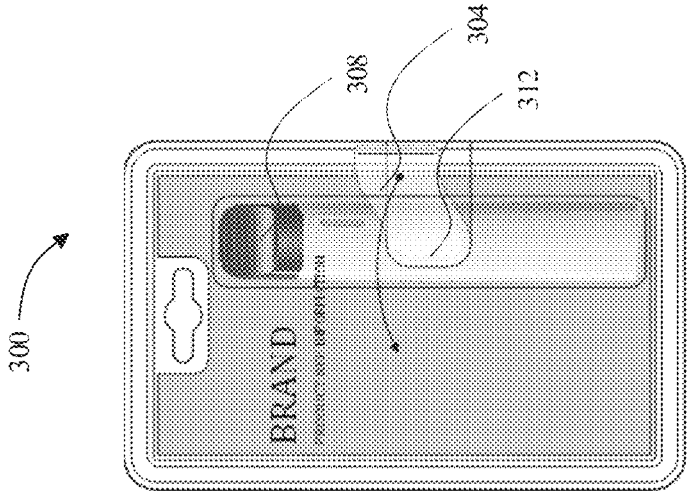
Figure 3A:
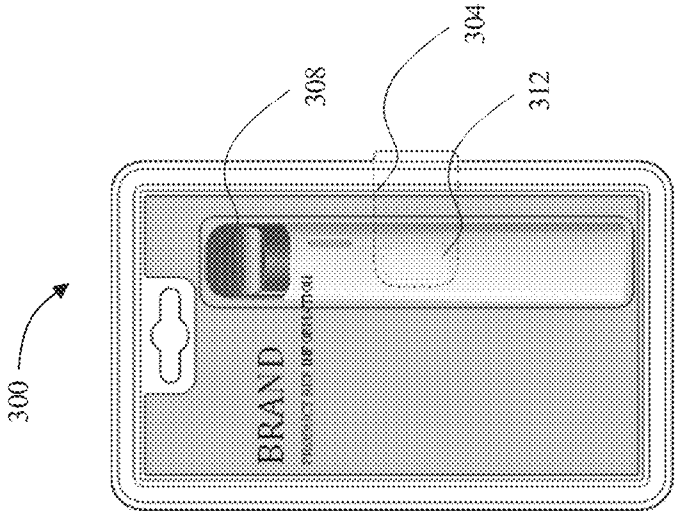

Now referring to FIGS. 3A-3C, an exemplary embodiment of a packaging 300 for a consumer aerosol delivery device, such as apparatuses described herein, is shown. In particular, packaging 300 may include a removable window 304 positioned above an aerosol delivery device 308 contained within packaging 300. In an embodiment, a sales location for the aerosol delivery device may unlock the aerosol delivery device after age verification of a buyer and biometric scanner 312, such as any biometric sensor described herein, may be activated while aerosol delivery devices is still contained in packaging 300. In an embodiment, once biometric scanner 312 is activated, an indicator light, such as any indicator light described herein, may be configured to blink a specified color. In an embodiment, specified color may be any of blue, purple, orange, and the like. Additionally, or alternatively, indicator light may be visible to the buyer through packaging 300. Further, indicator light may signal to the buyer/user that device 308 is ready for activation at the point of sale, such as described above. Buyer/user may then proceed to tear off or peel off removable window 304 and place their finger while the device is still in its packaging to activate aerosol delivery device 308. Additionally, or alternatively, removeable window 304 may include a packaging aperture to expose fingerprint scanner, a folding window that can be lifted, a sliding window that can be moved to expose fingerprint scanner, and the like.

Figure 4:
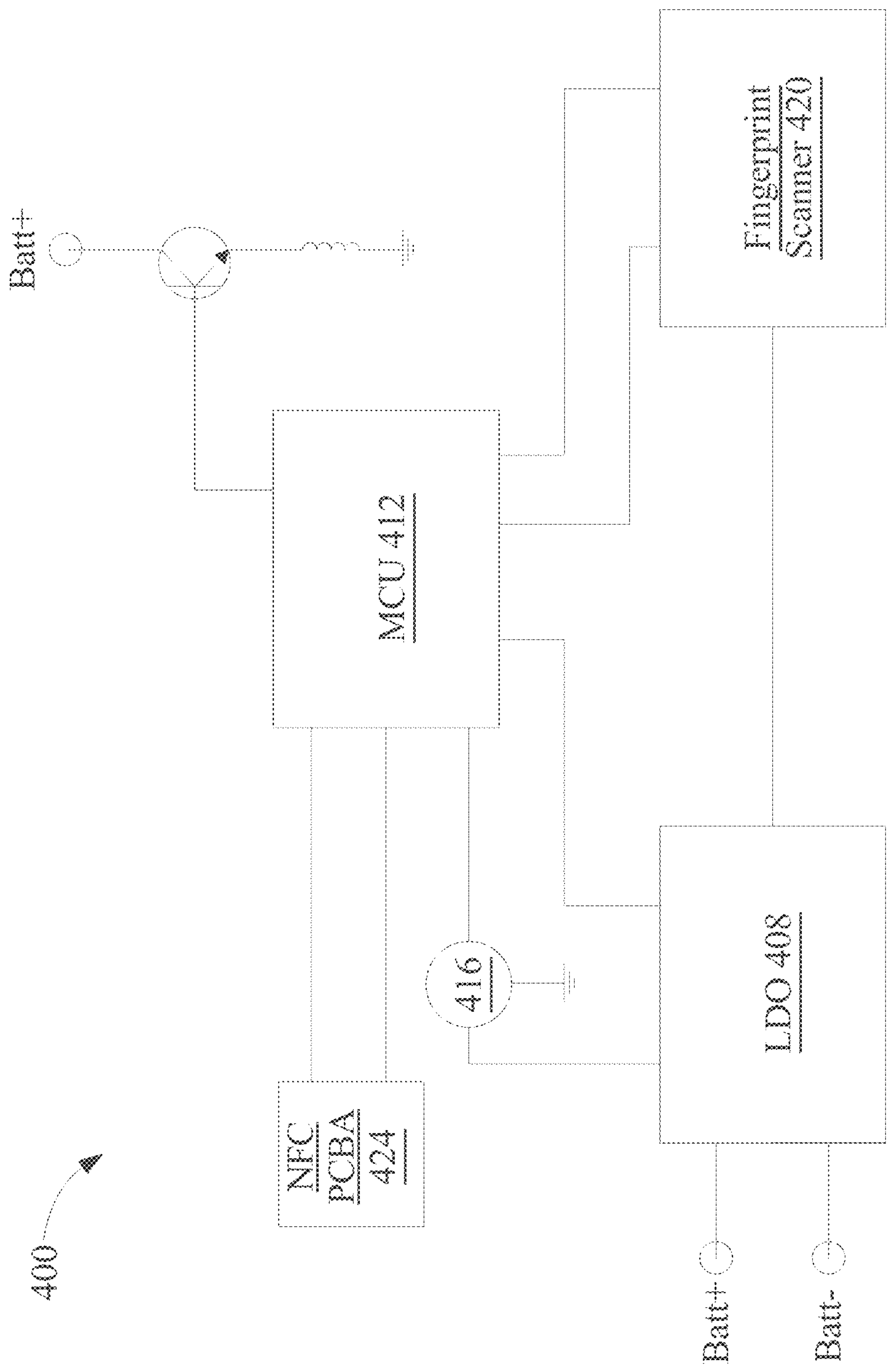
FIG. 4 is an exemplary schematic of an exemplary embodiment of an apparatus for biometric access control according to an embodiment.

Referring now to FIG. 4, a schematic of an exemplary embodiment of a device circuitry 400 is illustrated. Device circuitry 400 may integrate a battery 404, a Low Dropout Regulator (LDO) 408, a microcontroller unit (MCU) 412, a microphone 416, a fingerprint scanner 420, such as biometric sensor discussed in detail herein, an NFC PCBA 424, and the like. Device circuitry 400 may be powered by battery 404, which may include one or more positive (Batt+) terminal and one or more negative (Batt−) terminals. LDO 408 may be connected to battery 404 configured to regulate the voltage from battery 404 to a stable level suitable for MCU 412 and other sensitive components. In a non-limiting example, LDO 408 may ensure that fluctuations in battery voltage do not affect the performance of device circuitry 400 as described herein. MCU 412 may include any processing circuit, processor, or computing device as described in this disclosure. In some cases, MCU 412 may include BLE capabilities for wireless communication as described above with reference to FIG. 1. MCU 412 may be connected to LDO 408 to receive regulated electrical power. In some embodiments, MCU 304 may work as a computing device on a metal oxide semiconductor (MOS) integrated circuit (IC) chip. MCU 304 may communicate between wireless communication device, described below, containing NFC chip, and rest of components within device circuitry 300, such as, without limitation, power source, heating element, LED and the like thereof. MCU 412 may perform any processing step described in this disclosure. For instance, and without limitation, MCU 412 may determine and/or modify internal state, discussed below, based on current and/or voltage flow from an NFC chip through it. Internal state may include any internal state described above such as, without limitation, first binary state and second binary state.

With further reference to FIG. 4, in a non-limiting embodiment, microphone 416 may be included in device circuitry 400, connected between LDO 408 and MCU 412, wherein the microphone 416 may be used for voice recognition or audio input, complementing fingerprint scanner 420 for a multi-factor authentication. In some cases, fingerprint scanner 420 may be connected to MCU 412, wherein the fingerprint scanner 420 may be configured to capture fingerprint data pertaining to a user and send the captured fingerprint data to MCU 412 for processing and authentication as described above with reference to FIG. 1. NFC PCBA 424 configured for data transfer and device authentication may be connected to MCU 412. In some cases, NFC PCBA 424 may be configured to communicate with other NFC-enabled devices or systems, for example, and without limitation, external device e.g., an NFC reader. Additionally, or alternatively, a transistor, in particular, a BJT NPN transistor may be included in device circuitry 400, with its base connected to MCU 412. of the emitter of the BJT NPN may be connected to the ground, and the controller is connected to Batt+ through an inductor. In a non-limiting example, such transistor may act as a witch or amplifier, controlled by MCU 412. In some cases, device circuitry 400 may include a Complementary Metal-Oxide-Semiconductor (CMOS).

With continued reference to FIG. 3, in one or more embodiments, NFC PCBA 424 may include two antennas. Antennas may include any antenna described above. In a non-limiting example, NFC PCBA 424 may include a first antenna (i.e., ANT1) and a second antenna (i.e., ANT2), wherein the ANT1 may be a 2.4/5 GHz Wi-Fi antenna and the ANT2 may be a 2.4 GHz band antenna which may be used for Wi-Fi, ZigBee, Bluetooth, or RF4CE applications. As persons skilled in the art, upon reviewing the entirety of this disclosure, will be aware of various types of antennas and antennas for other frequencies that may be used by NFC PCBA 424 as described in this disclosure. In some embodiments, an NFC chip may be connected with antennas. In some embodiments, antennas may not be attached to NFC PCBA 424. In some cases, a magnetic insulator may be disposed in between antennas and power source 304 to shield antennas from aluminum on power source 308.

Figure 5A:
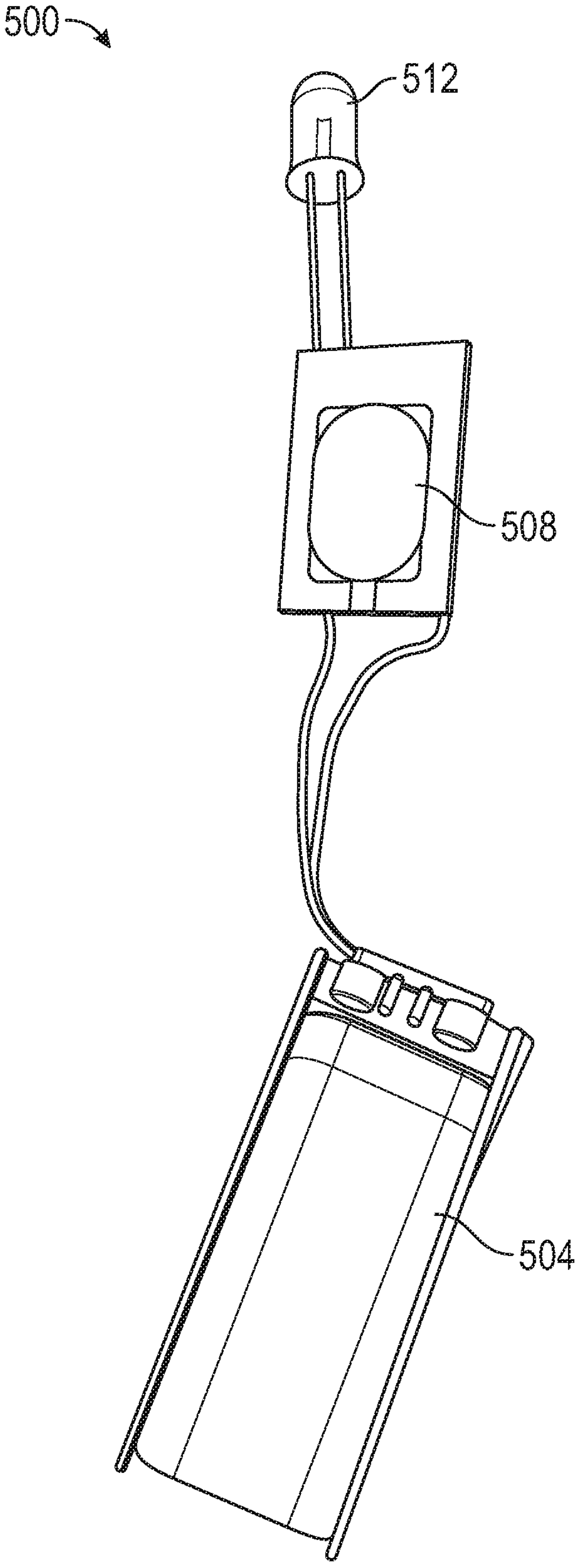
FIGS. 5A and 5B are perspective views of an exemplary embodiment of an apparatus for biometric access control according to an embodiment.
Figure 5B:
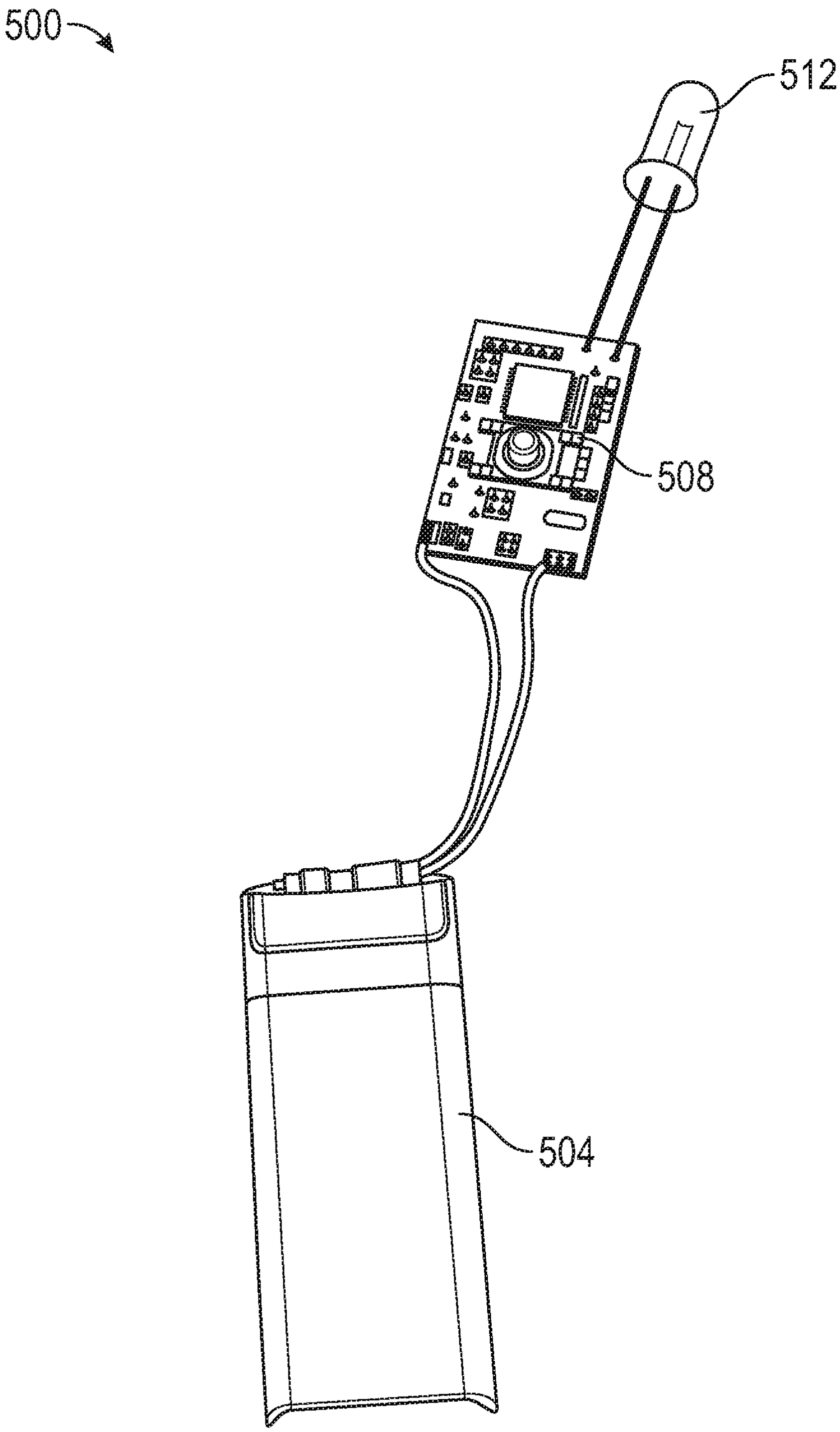

Referring now to FIGS. 5A-5B, an exemplary embodiment of a device circuitry 500 is illustrated. Device circuitry 500 may include a power source 504. Power source 504 may be any power source described herein. Additionally, device circuitry 500 may include a biometric sensor 508 coupled to power source 504. Biometric sensor 508 may include any biometric sensor described herein. Further, device circuitry may include sensor indicator 512 coupled to biometric sensor 508. Sensor indicator 512 may include any sensor indicator described herein.

Figure 6:
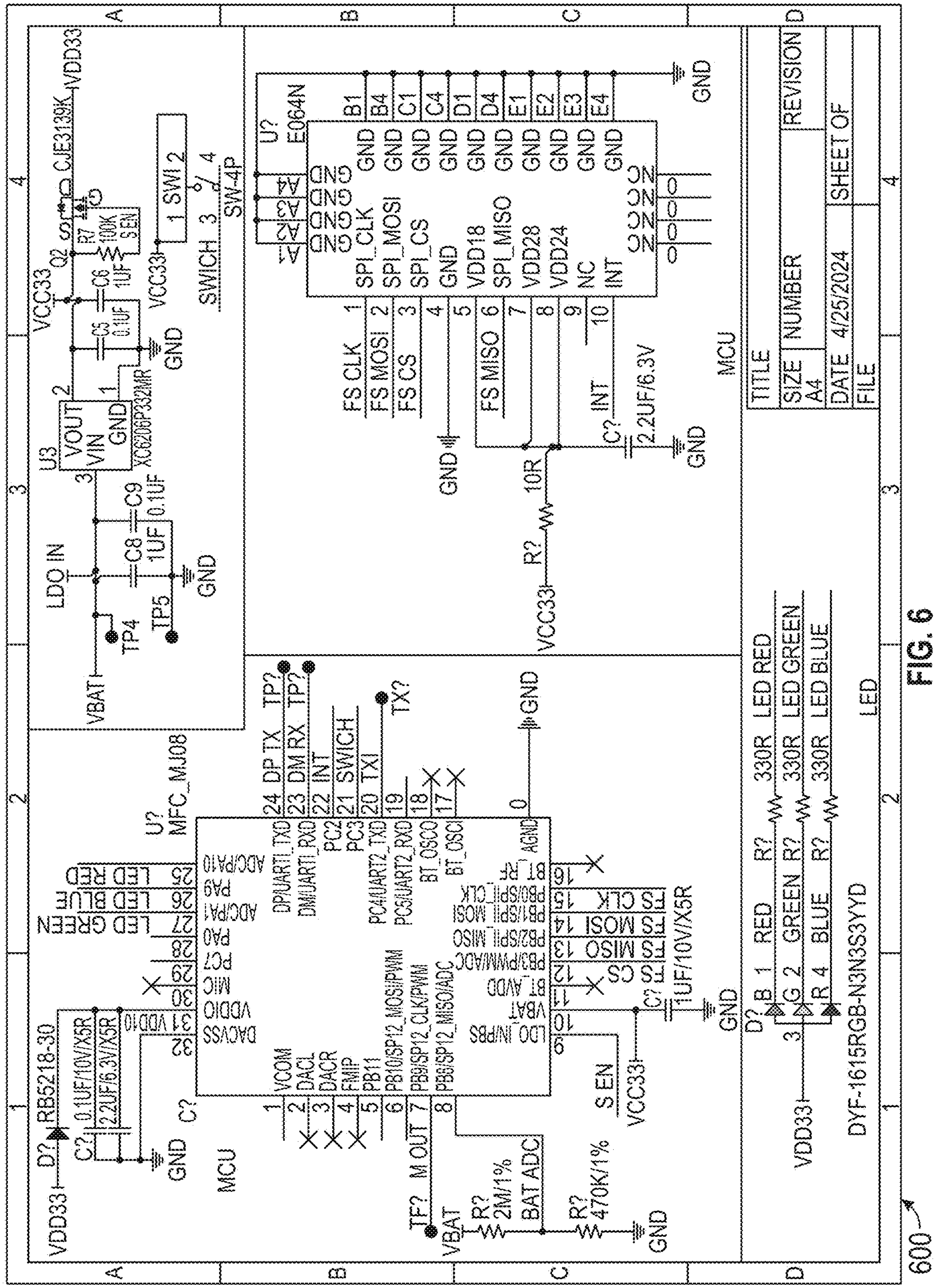
FIG. 6 is an exemplary schematic diagram of an apparatus for biometric access control according to an embodiment of the invention.

Referring now to FIG. 6, an exemplary schematic diagram 600 of an apparatus for biometric access control, such as any apparatus described herein, according to an embodiment of the invention is shown. In an embodiment, switch, such as a button (e.g., SW-4P), may be positioned to connect a power management integrated circuit (e.g., U3) and an micro controller unit (MCU) (e.g., E064N) through inputs and outputs, such as VCC33 and the like. Additionally, or alternatively, switch may be configured to connect central processing unit (CPU) (e.g., MFC_MJ08) through inputs and outputs (e.g., VCC33 and SWICH) of integrated circuit. In an embodiment, apparatus may be configured to initiate, such as described herein, when SW-4P is activated. Further, additionally, or alternatively, central processing unit may be configured to connect with micro controller unit through FS CLK, FS-CS, and the like. Additionally, CPU and MCU may be configured to exchange detected biometric data, such as described herein, and determine if the biometric data is a match or not. Further, additionally CPU may be communicatively connected to a light emitting diode (LED). LED may be consistent with any status indicator described herein. Additionally, or alternatively, CPU may be configured to determine what color LED is configured to display based on a status of biometric sensor, apparatus for biometric access control and the like.

Now referring to FIG. 7, a table 700 is an exemplary bill of materials for an apparatus for biometric access control, according to one embodiment is shown. In some cases, each material may be used to assemble an apparatus for biometric access control according to an exemplary schematic diagram as shown with reference to FIG. 6.

Referring now to FIG. 8, exemplary embodiments of activating an apparatus for biometric access controls are shown. For example, in an embodiment, processing circuit, such as any processing circuit described herein, may be programed to activate a biometric sensor, such as biometric scanner described herein, to collect biometric data based on the external response, such as described herein. In an embodiment, processing circuit may require user to provide biometric data immediately after activation of biometric sensor, such as under supervision at a point of sale, doctor's office, or the like. Additionally, or alternatively, processing circuit may provide a time limit for user to enter biometric data after activation of biometric sensor. Additionally, or alternatively, processing circuit may not provide a time limit for user to enter biometric data and biometric data may be provided by user at any time after activation of biometric sensor. Further, additionally, or alternatively, processing circuit may require an activation key, such as from a customer service representative, website, and the like, to allow a user to provide biometric data.

Figure 9:
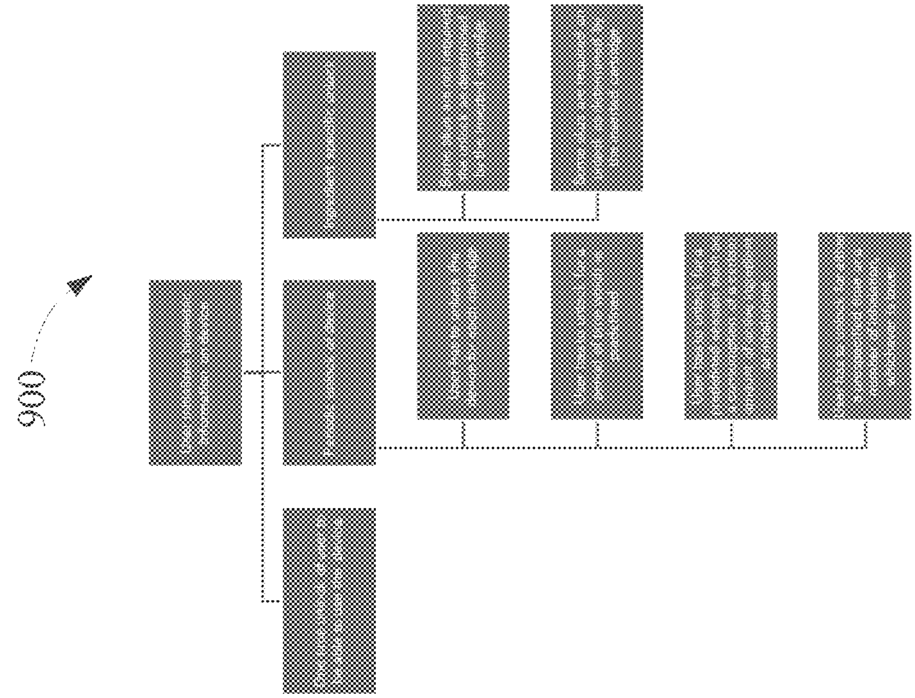
FIG. 9 shows exemplary embodiments of unlocking an apparatus for biometric access controls.

Referring now to FIG. 9, exemplary embodiments of unlocking an apparatus for biometric access controls, such as apparatuses described herein, using a biometric sensor, such as biometric sensor as described herein, are shown. In one exemplary embodiment, apparatus may only require user to provide biometric data a single time to unlock of apparatus using biometric data.

Still referring to FIG. 9, additionally, or alternatively, apparatus may require user to periodically provide biometric data to unlock apparatus using biometric data. In one example of periodically providing biometric data, apparatus may require user to provide biometric data for each cartridge inserted into apparatus to unlock apparatus for use. Additionally, or alternatively, apparatus may require user to provide biometric data after a predetermined period of time. For example, if apparatus has not been used for 5, 10, or 15 minutes, or the like, apparatus may require user to provide biometric data to unlock apparatus for further use. Additionally, or alternatively, apparatus may require user to provide biometric data after a predetermined amount of consumption of an active ingredient. For example, if apparatus has provided 5 or 10 milligrams, or the like, of an active ingredient, such as nicotine, prescription medication, and the like, apparatus may require user to provide biometric data to unlock apparatus for further use. Additionally, or alternatively, apparatus may require user to provide biometric data after a predetermined usage of apparatus. For example, if apparatus has been used for a predetermined amount of time and/or a number of inhalations, apparatus may require user to provide biometric data to unlock apparatus for further use.

Continuing to refer to FIG. 9, additionally, or alternatively, apparatus may require user to provide biometric data based on ingredients in a cartridge, such as cartridges described herein, to unlock apparatus using biometric data. For example, apparatus may be configured to determine active ingredients contained within a cartridge within apparatus and apparatus may be configured to determine whether biometric data is required to unlock apparatus for use with the cartridge. In an embodiment, apparatus and/or processing circuit may be configured to identify stock-keeping units (SKUs) associated with requiring biometric data and SKUs that are not associated with requiring biometric data and apparatus and/or processing circuit may require user to provide biometric data based on an identification of a SKU.

Figure 10C:
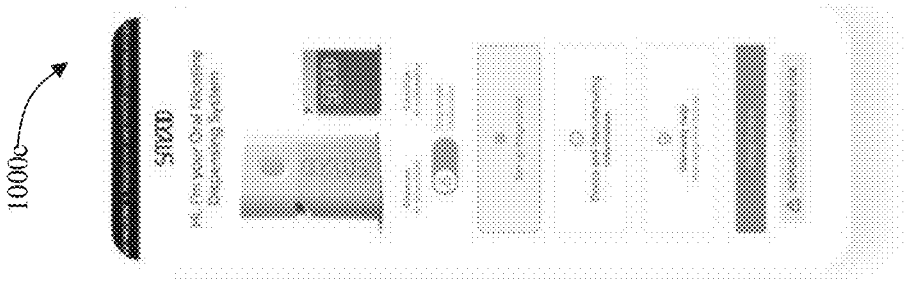
FIGS. 10A-10R are screenshots of exemplary embodiments a web or mobile application that may accompany an apparatus for biometric access control.
Figure 10B:
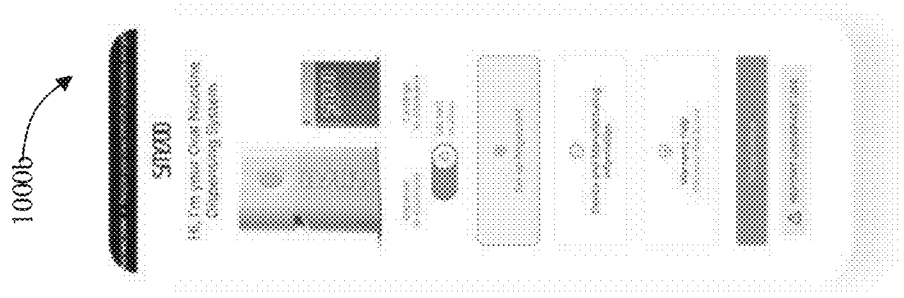
Figure 10A:
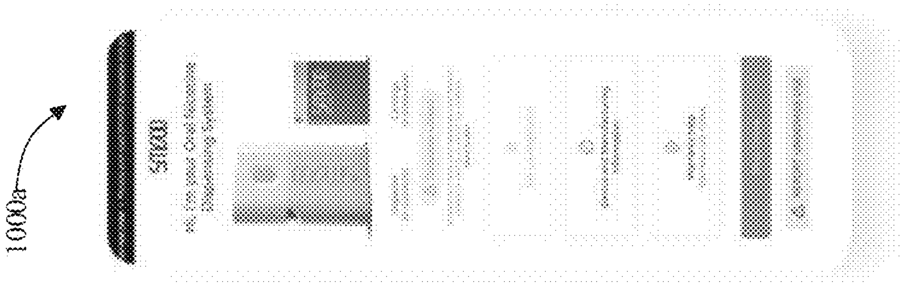
Figure 10F:
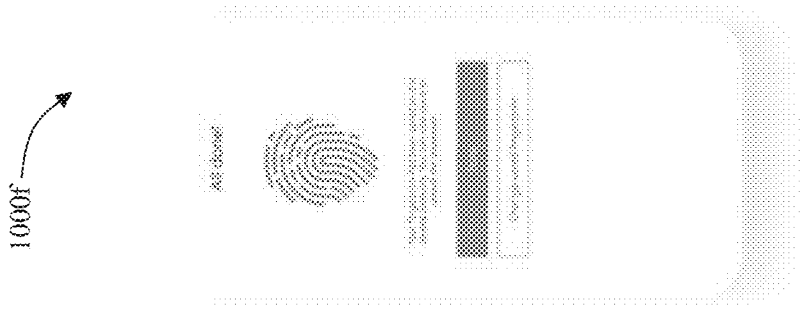
Figure 10E:
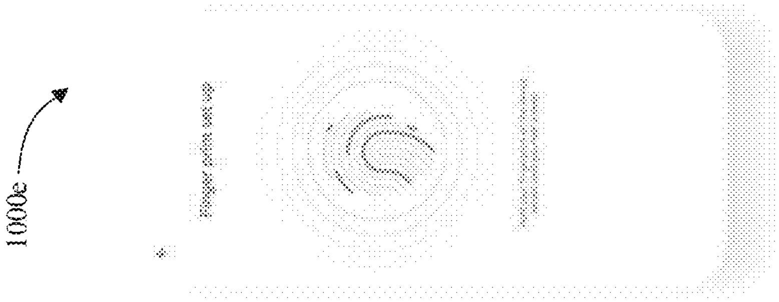
Figure 10D:
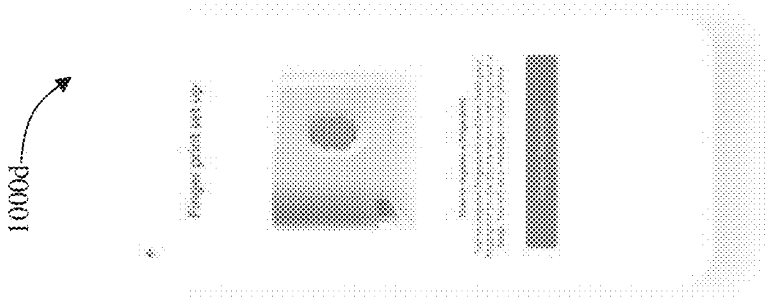
Figure 10I:
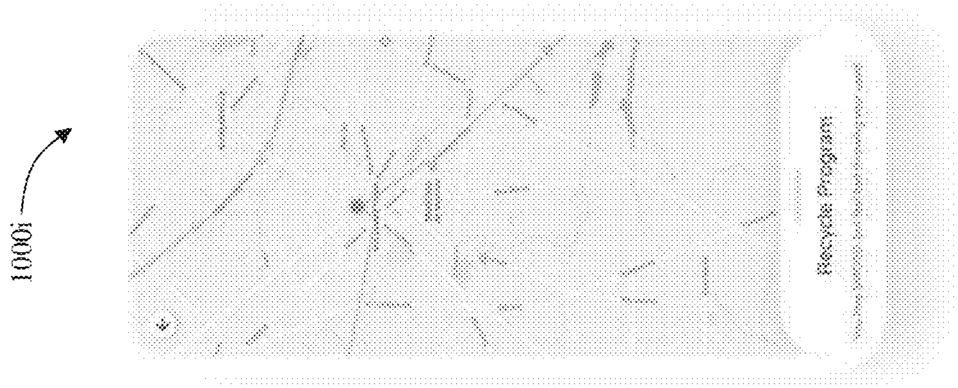
Figure 10H:
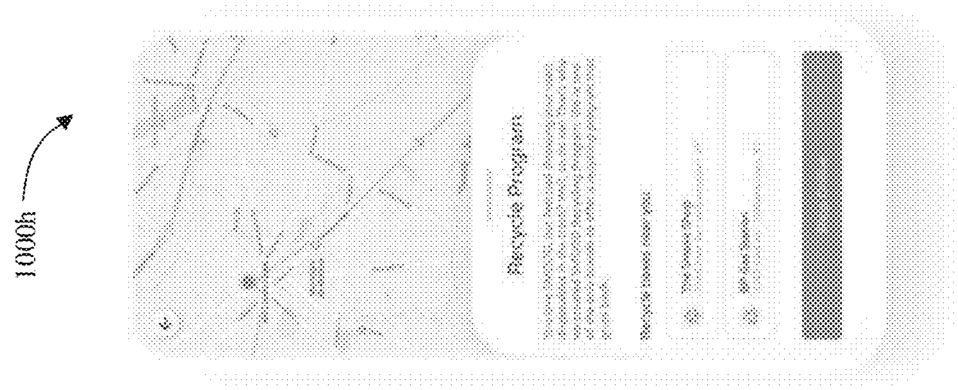
Figure 10G:
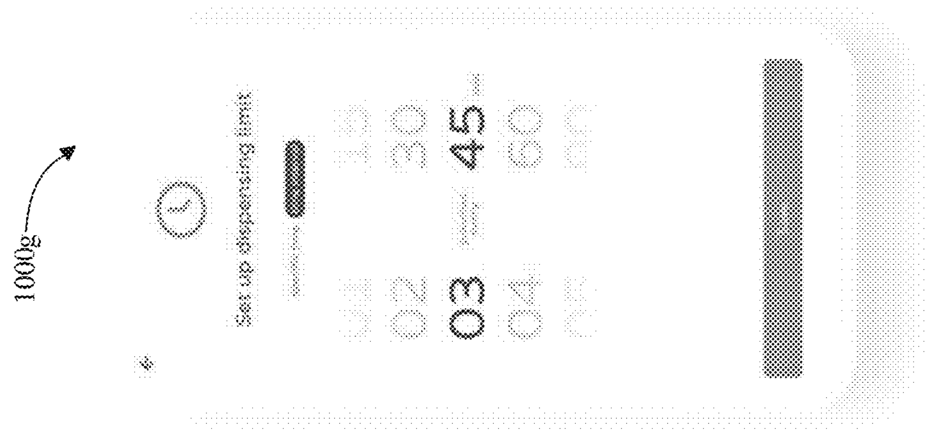
Figure 10L:
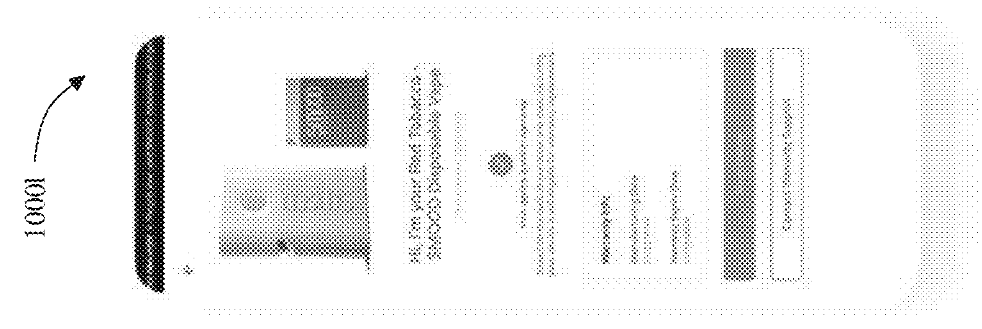
Figure 10K:
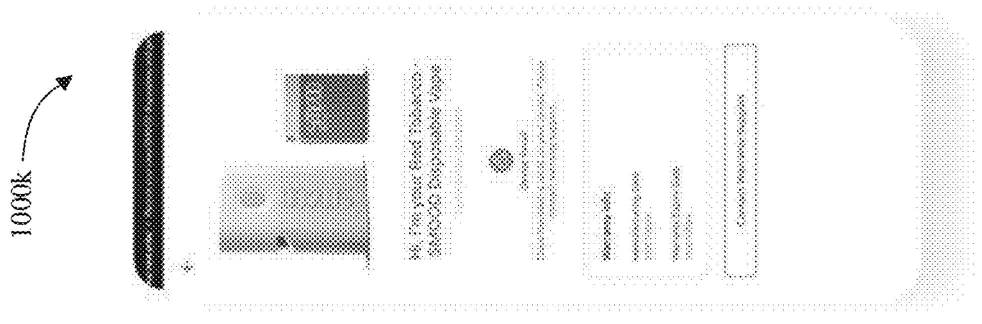
Figure 10J:
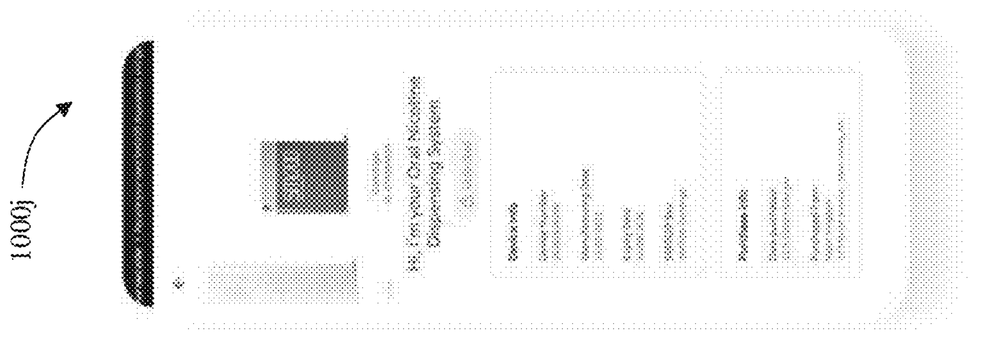
Figure 10M:
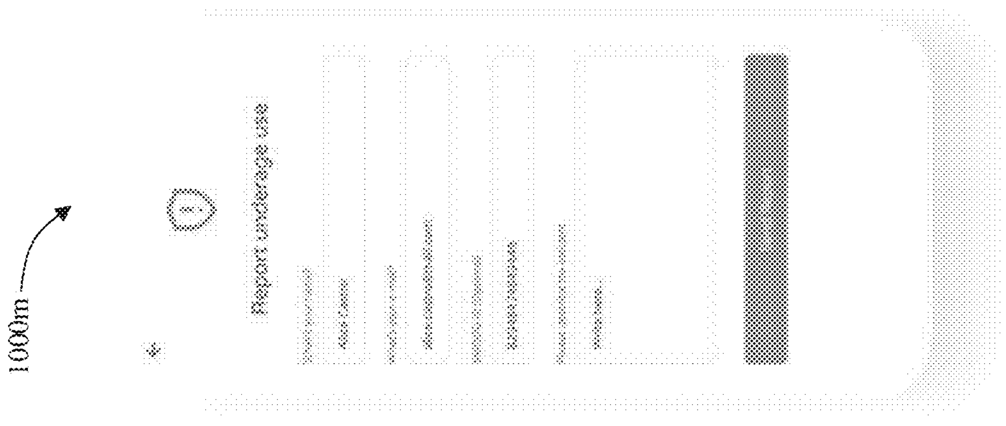
Figure 10N:
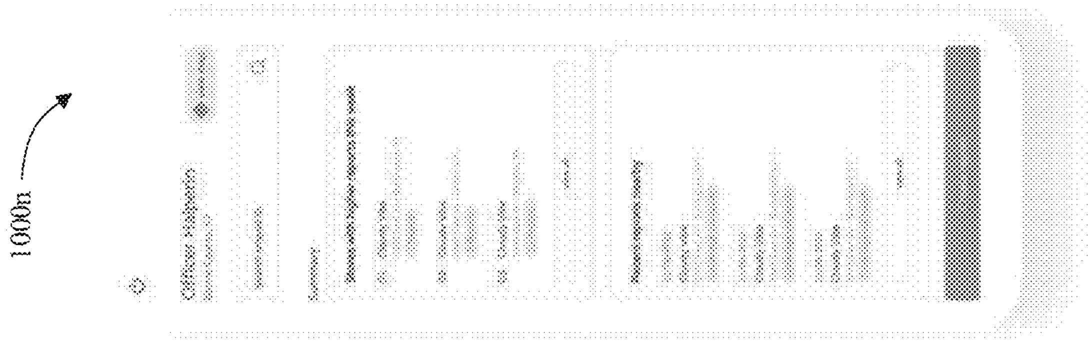
Figure 10O:
Figure 10R:
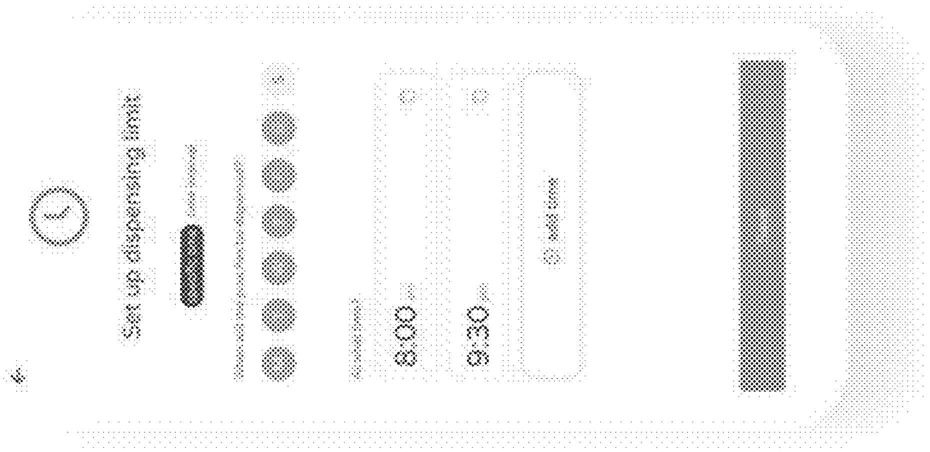
Figure 10Q:
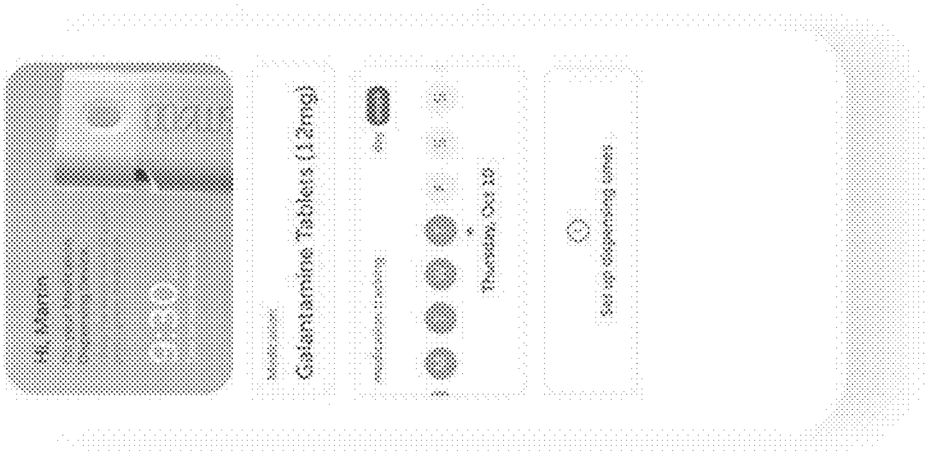
Figure 10P:
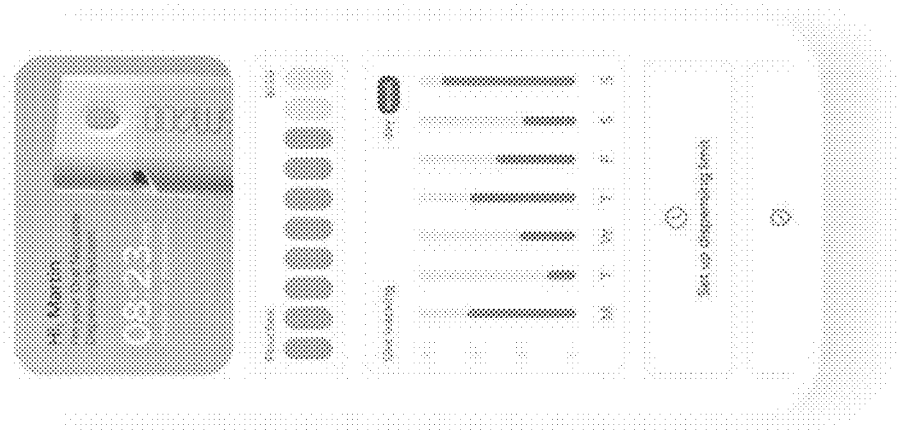

Now referring to FIGS. 10A-10R, screenshots of exemplary embodiments a web or mobile application that may, in an embodiment, accompany a biometrically enabled device, such as apparatuses described herein, including an NFC chip and/or a Bluetooth system configured to pair with a user device are shown. As shown in FIGS. 10A-10C, exemplary embodiments of a mobile application for a consumer product, such as apparatuses described herein, show a first screen indicating a first locked status 1000*a*, such as before age verification at the point of sale for apparatus, a second screen indicating a second locked status 1000*b*, such as after age verification at a point of sale, and a third screen indicating an unlocked state 1000*c*, such as after age verification and activation at a point of sale. As shown in FIGS. 10D-10F, exemplary embodiments of a mobile application for a consumer product, such as apparatuses described herein, show a first screen 1000*d* for a first set-up step for biometric pairing, a second screen 1000*e* for a second step for biometric pairing, and a third screen 1000*f* for a third step for biometric pairing. Additionally, or alternatively, mobile application may be configured to lock the device for a pre-specified time, set dispensing limits, such as shown in an exemplary screen 1000*g* as shown in FIG. 10G, access warranty support, such as shown in an exemplary screen 1000*l* as shown in FIG. 10L, find recycling drop offs, such as shown in a first exemplary screen 1000*h* as shown in FIG. 10H and a second exemplary screen 1000*i* as shown in FIG. 10I, shop online, receive device or purchasing information, such as shown in an exemplary screen 1000*j* as shown in FIG. 10J, interact with a recall notification, such as shown in an exemplary screen 1000*k* as shown in FIG. 10K, report underage access, such as shown in a first exemplary screen 1000*m* as shown in FIG. 10M, a second exemplary screen 1000*n* as shown in FIG. 10N, and a third exemplary screen 1000*o* as shown in FIG. 10O, track usage, such as shown in an exemplary screen 1000*p* as shown in FIG. 10P, or set-up predetermined times for dispensing, such shown in a first exemplary screen 1000*q* as shown in FIG. 10Q and a second exemplary screen 1000*r* as shown in FIG. 10R and the like. Without limitation, a mobile application for a medical drug dispensing system (e.g. for the use in prescription drugs or medical cannabis) may also prevent unauthorized access, have dispensing limits, an indication on fill-levels and a method to order drug refills. In addition to consumer devices, without limitation, medical dispensing systems may involve webapps/mobile app interfaces that promote medication adherence through an alert system to take medications at a pre-specified interval, a communications interface with a patient's physician, an interface to refill prescriptions, an interface for physicians to monitor patient drug adherence, a feedback interface on potential side effects/adverse events, a community site of other patients, and the like.

Figure 11:
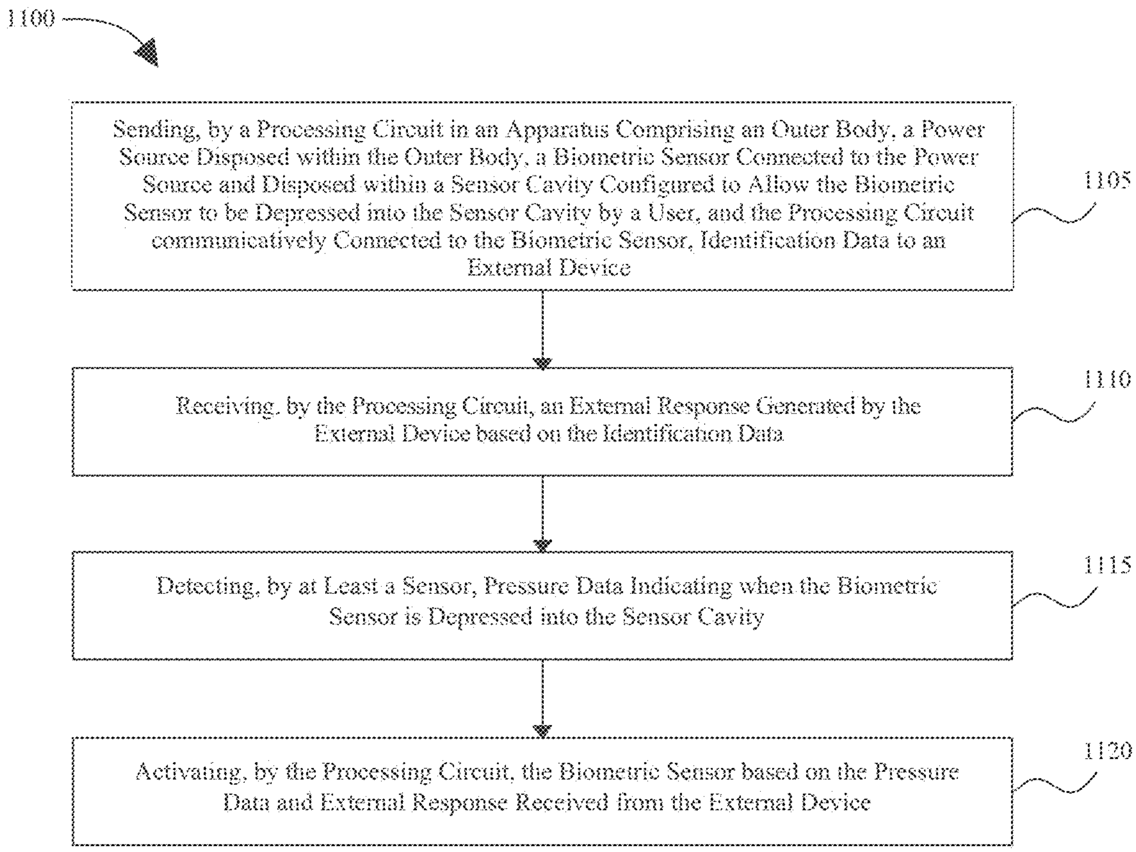
FIG. 11 is a flow diagram of an exemplary method for biometric access control according to an embodiment.

Referring now to FIG. 11, a flow diagram for a method 1100 for near field communication (NFC) reading is shown. Method 1100 includes a step 1105 of sending, by a processing circuit in an apparatus comprising an outer body, a power source disposed within the outer body, a biometric sensor connected to the power source, and the processing circuit communicatively connected to the biometric sensor, identification data to an external device. This may be implemented, without limitation, as described above in reference to FIGS. 1-10.

With continued reference to FIG. 11, method 1100 includes a step 1110 of receiving, by the processing circuit, an external response generated by the external device based on the identification data. This may be implemented, without limitation, as described above in reference to FIGS. 1-10.

Still referring to FIG. 11, method 1100 includes a step 1115 of detecting, by at least a sensor, pressure data indicating when the biometric sensor is depressed into the sensor cavity. This may be implemented, without limitation, as described above in reference to FIGS. 1-10.

With further reference to FIG. 11, method 1100 includes a step 1120 of activating, by the processing circuit, the biometric sensor based on the external response received from the external device. This may be implemented, without limitation, as described above in reference to FIGS. 1-10.

Continuing to reference FIG. 11, additionally, or alternatively, method 1100 may include sending, by the processing circuit, usage data associated with the apparatus to the external device. Further, in an embodiment, method 1100 may include detecting, by at least one sensor, sensor data. Additionally, or alternatively, method 1100 may include receiving, by the processing circuit, the detected sensor data from the at least one sensor and activating, by the processing circuit, the biometric sensor based on the detected sensor data. These may be implemented, without limitation, as described above in reference to FIGS. 1-10.

Still referring to FIG. 11, additionally, or alternatively, method 1100 may include receiving, by a user interface, a user input. Further, additionally, or alternatively, method 1100 may include prompting, by the processing circuit, the user to input a first user input using the user interface, receiving, by the processing circuit, the user input, and storing, by the processing circuit, the first user input as a reference user input. Furthermore, additionally, or alternatively, method 800 may include receiving, by the processing circuit, a second user input, comparing, by the processing circuit, the second user input to the reference user input, and activating, by the processing circuit, the biometric sensor based on match in comparing the second user input and the reference user input. These may be implemented, without limitation, as described above in reference to FIGS. 1-10.

Continuing to refer to FIG. 11, method 1100 may include receiving, by the processing circuit, first biometric data once activated and storing, by the processing circuit, the first biometric data as reference biometric data. Further, additionally, or alternatively, method 1100 may include receiving, by the processing circuit, second biometric data, comparing, by the processing circuit, the second biometric data to the reference biometric data, and modifying, by the processing circuit, an internal state of the apparatus based on a match in comparing the second biometric data and the reference biometric data. Furthermore, additionally, or alternatively, method 1100 may include determining, by the processing circuit, a device usability of the apparatus based on the modified internal state based on the match in comparing the second biometric data and the reference biometric data. These may be implemented, without limitation, as described above in reference to FIGS. 1-10.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
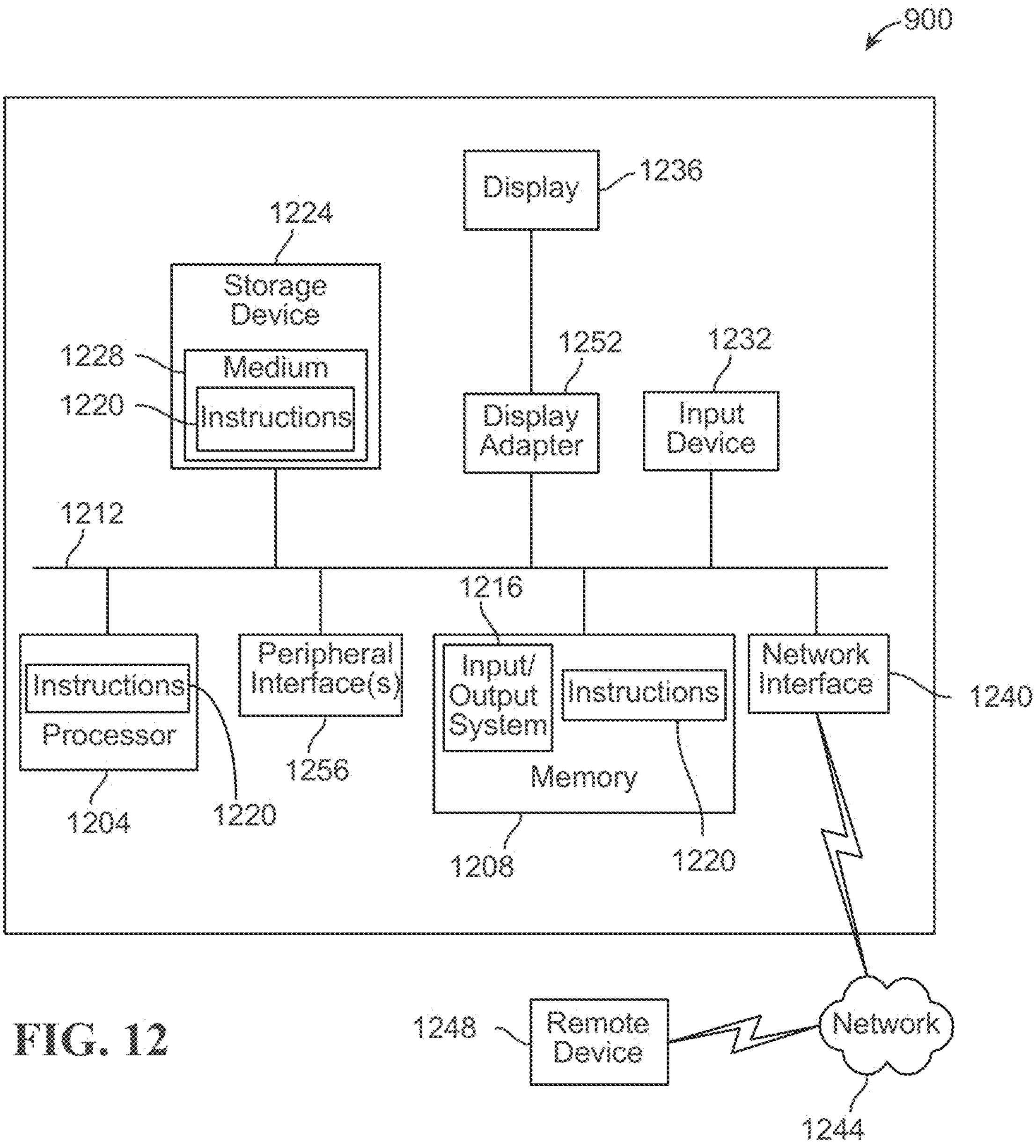
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display 1236. Examples of a display device include, but are not limited to, a liquid crystal display (LCD), a cathode ray tube (CRT), a plasma display, a light emitting diode (LED) display, and any combinations thereof. Display adapter 1252 and display 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

The invention claimed is:

1. An apparatus for biometric access control, wherein the apparatus comprises:

an outer body configured to house a plurality of internal components;

a power source disposed within the outer body, wherein the power source is configured to provide power;

a biometric sensor connected to the power source, wherein the biometric sensor is configured to receive biometric data associated with a user and the biometric sensor is disposed within a sensor cavity configured to allow the biometric sensor to be depressed into the sensor cavity by a user;

a pressure sensor configured to detect pressure data indicating when the biometric sensor is depressed into the sensor cavity;

an NFC chip or RFID chip; and a processing circuit communicatively connected to the biometric sensor and the NFC chip or RFID chip, wherein the processing circuit is configured to:

send identification data to an external device, using the NFC chip or RFID chip;

receive, via the NFC chip or RFID chip, an external response generated by the external device based on receipt of the identification data;

initially activate the biometric sensor based on the external response, wherein the unlocking of the biometric sensor enables an activation of the biometric sensor;

receive pressure data from the pressure sensor; and subsequently activate the biometric sensor when the pressure data indicates that the biometric sensor is depressed into the sensor cavity, wherein the identification data is configured to uniquely identify at least one of the apparatus, the NFC chip, or the RFID chip.

2. The apparatus of claim 1, wherein the external response consists of an initial activation signal.

3. The apparatus of claim 1, wherein the biometric sensor comprises a biometric reading window surrounded by a seal.

4. The apparatus of claim 1, wherein the processing circuit is configured to send usage data associated with the apparatus to the external device.

5. The apparatus of claim 1, wherein the processing circuit is further configured to receive first biometric data, via the biometric sensor, once initially activated and store the first biometric data as reference biometric data.

6. The apparatus of claim 5, wherein the processing circuit is further configured to:

receive second biometric data, after being subsequently activated;

compare the second biometric data to the reference biometric data; and modify an internal state of the apparatus based on a match in comparing the second biometric data and the reference biometric data.

7. The apparatus of claim 6, wherein processing circuit is further configured to determine a device usability of the apparatus based on the modified internal state based on the match in comparing the second biometric data and the reference biometric data.

8. The apparatus of claim 7, wherein the modification of the internal state includes converting the apparatus from a locked to an unlocked state.

9. A method for biometric access control, wherein the method comprises:

providing an apparatus comprising: an outer body, a power source disposed within the outer body, a biometric sensor connected to the power source and disposed within a sensor cavity configured to allow the biometric sensor to be depressed into the sensor cavity by a user, a pressure sensor configured to detect pressure data indicating when the biometric sensor is depressed into the sensor cavity, an NFC chip or RFID chip, and a processing circuit communicatively connected to the biometric sensor and the NFC chip or RFID chip;

sending, by the processing circuit via the NFC chip or RFID chip, identification data to an external device;

receiving, by the processing circuit via the NFC chip or RFID chip, an external response generated by the external device based on receipt of the identification data;

initially activating the biometric sensor based on the external response;

detecting, by the pressure sensor, the pressure data indicating when the biometric sensor is depressed into the sensor cavity; and subsequently activating the biometric sensor when the pressure data indicates that the biometric sensor is depressed into the sensor cavity, wherein the identification data is configured to uniquely identify at least one of the apparatus, the NFC chip, or the RFID chip.

10. The method of claim 9, further comprising sending, by the processing circuit, usage data associated with the apparatus to the external device.

11. The method of claim 9, wherein the external response consists of an initial activation signal.

12. The method of claim 9, wherein the biometric sensor comprises a biometric reading window surrounded by a seal.

13. The method of claim 9, further comprising:

after the initial activation of the biometric sensor, prompting, by the processing circuit, the user to input a first biometric data;

receiving, by the processing circuit via the biometric sensor, the first biometric data; and storing, by the processing circuit, the first biometric data as a reference biometric data.

14. The method of claim 13, further comprising:

after the subsequent activation, receiving, by the processing circuit via the biometric sensor, a second biometric data;

comparing, by the processing circuit, the second biometric data to the reference biometric data; and modifying, by the processing circuit, an internal state of the apparatus based on a match in comparing the second biometric data and the reference biometric data.

15. The method of claim 14, wherein the modification of the internal state includes converting the apparatus from a locked to an unlocked state.

16. The method of claim 15, further comprising returning the unlocked apparatus back to a locked state after a predetermined condition is satisfied, wherein the predetermined condition comprises at least one of a predetermined unlock time, a predetermined amount of consumption of an active ingredient, a predetermined usage limit.

17. The method of claim 16, wherein the predetermined unlock time is within a range of 5 to 10 minutes, the predetermined amount of consumption of an active ingredient is within a range of greater than zero to 10 mg, and the predetermined usage limit comprises a predetermined number of inhalations.

18. The method of claim 15, further comprising periodically requiring the user to provide the second biometric data to unlock the apparatus.

19. The method of claim 17, wherein the predetermined amount of consumption of an active ingredient is within a range of 5 mg to 10 mg.

* * * * *